(12) United States Patent
Russell

(10) Patent No.: US 10,044,581 B1
(45) Date of Patent: Aug. 7, 2018

(54) NETWORK TRAFFIC TRACKING USING ENCAPSULATION PROTOCOL

(71) Applicant: Amazon Technologies, Inc., Seattle, WA (US)

(72) Inventor: David Sean Russell, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 286 days.

(21) Appl. No.: 14/869,907

(22) Filed: Sep. 29, 2015

(51) Int. Cl.
G06F 15/16 (2006.01)
H04L 12/26 (2006.01)
H04L 12/46 (2006.01)

(52) U.S. Cl.
CPC .......... H04L 43/08 (2013.01); H04L 12/4633 (2013.01); H04L 43/06 (2013.01)

(58) Field of Classification Search
CPC . H04L 12/4633; H04L 2212/00; H04L 43/08; H04L 45/123; H04L 45/124; H04L 67/1021; H04L 67/1023; H04L 67/26; G06F 2009/45595; G06F 9/45533; G06F 2221/034; G06F 9/45558; G06F 9/5077
USPC .................................................. 709/203–238
See application file for complete search history.

(56) References Cited

U.S. PATENT DOCUMENTS

| | | | |
|---|---|---|---|
| 5,919,248 A | 7/1999 | Kahkoska et al. | |
| 6,958,998 B2 | 10/2005 | Shorey | |
| 7,177,927 B1 | 2/2007 | Cahn | |
| 7,634,682 B2 | 12/2009 | Black et al. | |
| 7,940,685 B1 * | 5/2011 | Breslau ............... | H04L 43/0835 370/251 |
| 7,941,859 B2 | 5/2011 | Camenisch et al. | |
| 7,975,184 B2 | 7/2011 | Goff et al. | |
| 8,082,581 B2 | 12/2011 | Wu | |
| 8,209,749 B2 | 6/2012 | Babula et al. | |
| 8,228,818 B2 * | 7/2012 | Chase .................... | H04L 43/12 370/232 |
| 8,261,341 B2 | 9/2012 | Stirbu | |
| 8,443,435 B1 | 5/2013 | Schroeder | |
| 8,539,593 B2 | 9/2013 | Tan et al. | |
| 8,543,734 B2 | 9/2013 | McDysan | |
| 8,559,441 B2 | 10/2013 | Miyabe | |
| 8,559,449 B2 | 10/2013 | Rao et al. | |

(Continued)

OTHER PUBLICATIONS

U.S. Appl. No. 14/274,477, filed May 9, 2014, Upendra Bhalchandra Shevade, et al.

(Continued)

Primary Examiner — Moustafa M Meky
Assistant Examiner — Thorne E Waugh
(74) Attorney, Agent, or Firm — Robert C. Kowert; Meyertons, Hood, Kivlin, Kowert & Goetzel, P.C.

(57) ABSTRACT

A first encapsulation protocol processing component (EPPC) at a particular device of a virtualized computing service establishes a network packet tracking session with a second EPPC at another device. The first EPPC tags at least some encapsulation packets (which contain baseline packets generated at or directed to guest virtual machines) sent to the second EPPC as tracked packets. The first EPPC obtains network metrics corresponding to the tracked packets of the session from the second EPPC, prepares network health updates based on the metrics, and send the updates to a network health management service associated with the virtualized computing service.

21 Claims, 20 Drawing Sheets

(56) References Cited

U.S. PATENT DOCUMENTS

| | | | |
|---|---|---|---|
| 8,612,599 | B2 | 12/2013 | Tung et al. |
| 8,656,420 | B2 | 2/2014 | Foster et al. |
| 8,705,394 | B2 | 4/2014 | Venkatachalapthy et al. |
| 8,726,392 | B1 | 5/2014 | McCorkendale et al. |
| 8,856,869 | B1 | 10/2014 | Brinskelle |
| 8,869,286 | B1 | 10/2014 | Liu |
| 8,949,994 | B2 | 2/2015 | Amit et al. |
| 8,959,633 | B1 * | 2/2015 | Dokey .................... G06F 21/50 705/30 |
| 8,984,642 | B2 | 3/2015 | Pistoia et al. |
| 9,075,997 | B2 | 7/2015 | Artzi et al. |
| 9,331,920 | B2 * | 5/2016 | Nedeltchev ............. H04L 43/08 |
| 9,521,053 | B1 * | 12/2016 | Chen ....................... H04L 43/08 |
| 2003/0061340 | A1 | 3/2003 | Sun et al. |
| 2005/0262269 | A1 | 11/2005 | Pike |
| 2006/0031461 | A1 | 2/2006 | Mathur et al. |
| 2007/0211730 | A1 | 9/2007 | Cuthbert et al. |
| 2008/0134046 | A1 | 6/2008 | Gray et al. |
| 2008/0181134 | A1 | 7/2008 | Anerousis et al. |
| 2009/0327821 | A1 | 12/2009 | Bauerle et al. |
| 2010/0122175 | A1 | 5/2010 | Gupta et al. |
| 2010/0162036 | A1 | 6/2010 | Linden et al. |
| 2010/0275262 | A1 | 10/2010 | Anand et al. |
| 2011/0126059 | A1 | 5/2011 | Klein |
| 2011/0145836 | A1 | 6/2011 | Wheeler et al. |
| 2013/0031424 | A1 | 1/2013 | Srivastava et al. |
| 2013/0227355 | A1 | 8/2013 | Dake et al. |
| 2014/0075048 | A1 | 3/2014 | Yuksel et al. |
| 2014/0089493 | A1 | 3/2014 | Bauer et al. |
| 2014/0280884 | A1 * | 9/2014 | Searle ................. H04L 43/0864 709/224 |
| 2015/0195178 | A1 * | 7/2015 | Bhattacharya ........ H04L 45/745 718/1 |

OTHER PUBLICATIONS

U.S. Appl. No. 14/869,905, filed Sep. 29, 2015, David Sean Russell.

Srikanth Kandula, et al., "The Nature of Datacenter Traffic: Measurements & Analysis", IMC'09, ACM, Nov. 4-6, 2009, pp. 202-208.

Albert Greenberg, et al., "VL2: A Scalable and Flexible Data Center Network", SIGCOMM'09, ACM, Aug. 17-21, 2009, pp. 1-12.

U.S. Appl. No. 15/279,345, filed Sep. 28, 2016, Kenneth Grey Richards et al.

U.S. Appl. No. 15/279,346, filed Sep. 28, 2016, Kenneth Grey Richards et al.

U.S. Appl. No. 15/279,347, filed Sep. 28, 2016, Kenneth Grey Richards et al.

U.S. Appl. No. 15/279,351, filed Sep. 28, 2019, Kenneth Grey Richards et al.

Amazon Web Services, "AWS Direct Connect" User Guide API Version, Oct. 22, 2013, pp. 1-42.

Amazon Web Services, "Amazon Virtual Private Cloud", User Guide API Version, Oct. 1, 2013, pp. 1-143.

* cited by examiner

Tunable parameters for network health management 1602

Tracking session establishment parameters 1603

Session abandonment/termination parameters 1607

Sampling parameters 1611

Route changing (hash switching) parameters 1615

Metrics collection and reporting triggers 1619

Impairment detection thresholds 1623

Follow-up request parameters 1627

Tracking overhead limit parameters 1631

Remedial action parameters 1635

Client-customizable parameters 1639 (e.g., high-priority GVMs)

FIG. 16

NETWORK TRAFFIC TRACKING USING ENCAPSULATION PROTOCOL

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

In many cases, clients of virtualized computing services may not have much control over the specific virtualization hosts selected for their virtual machines, or over the network paths that may be used for inbound and outbound traffic of their virtual machines. Instead, the clients may rely on the provider of the virtualized computing service to select virtualization hosts and network paths that are capable of supporting the desired levels of performance, availability, and the like. In order to meet the clients' service level requirements, the operator of the virtualized computing service may sometimes monitor the performance and health states of various components of the service using special-purpose agents. Some such agents may, for example, transmit heartbeat messages to each other and/or use the equivalent of the "ping" utility to determine the health states of service components. However, at least in some cases, the kinds of data collected by such agents may not necessarily indicate actual performance problems experienced by client applications, or reveal the problems quickly enough for mitigating actions to be taken in the appropriate timeframe.

BRIEF DESCRIPTION OF DRAWINGS

FIG. 16 illustrates example parameters which may be tuned for encapsulation protocol-based packet tracking, according to at least some embodiments.

Figure 1:
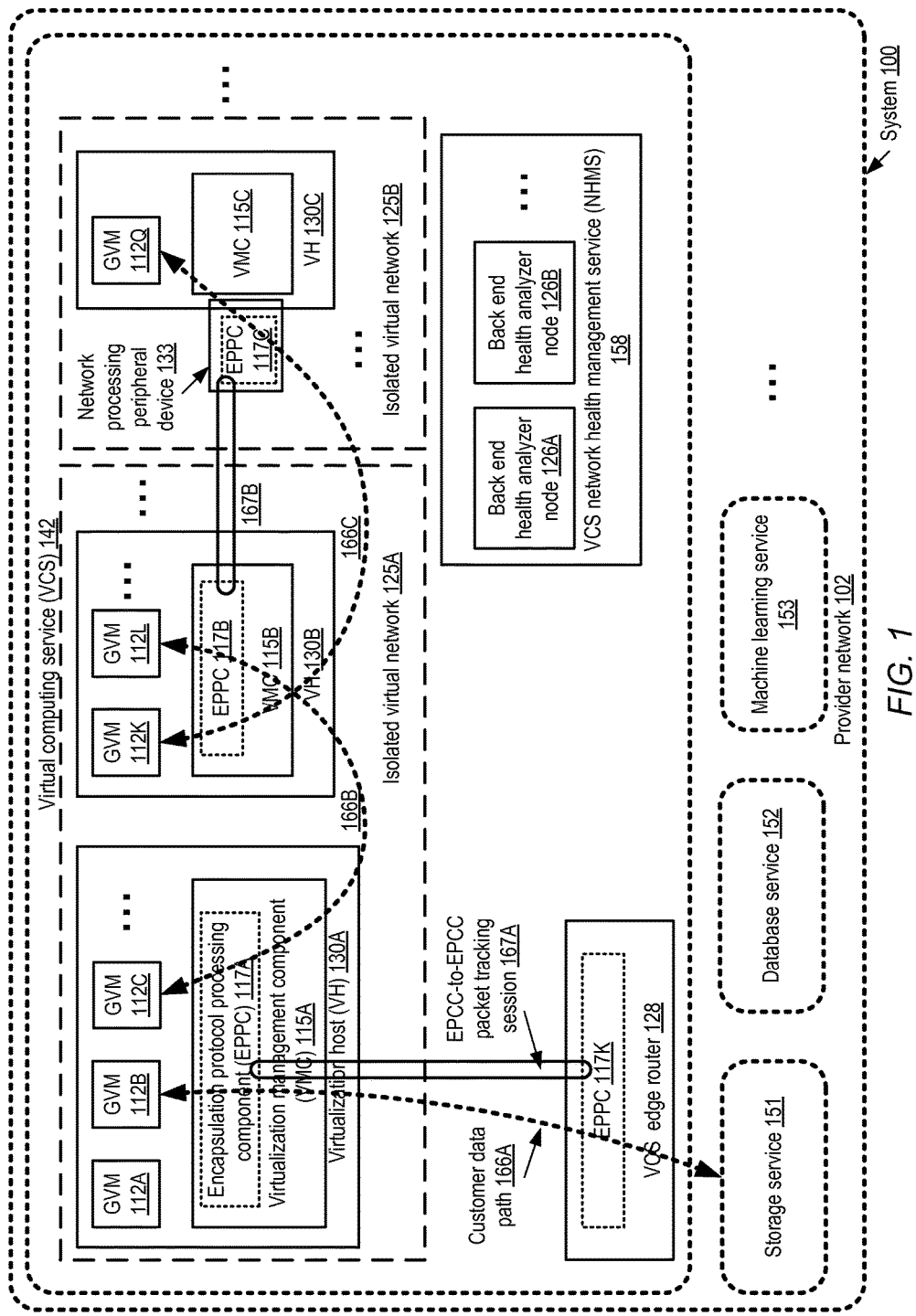
FIG. 1 illustrates an example system environment in which a packet tracking algorithm involving the use of encapsulation protocol headers may be implemented at a virtualized computing service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for network health management using data collected by encapsulation protocol processing components (EPPCs) of a virtualized computing service (VCS) are described. A virtual computing service (e.g., implemented at a provider network) may comprise numerous computing devices including, for example, virtualization hosts, internal routers, edge routers, load balancers and the like. In various embodiments, one or more guest virtual machines (GVMs) may be instantiated on behalf of one or more clients of the VCS at a given virtualization host. A given GVM may be assigned a particular network address (e.g., an Internet Protocol (IP) version 4 or IP version 6), e.g., from a range of network addresses selected for an isolated virtual network (IVN) established for a client in some embodiments. A virtualization host may comprise several different GVMs with respective IP addresses. The virtualization host may also be assigned its own network address, e.g., corresponding to the host's network interface card (NIC) and the physical network to which the NIC is attached.

In order to enable traffic to flow between GVMs at different virtualization hosts, and between a given GVM and network endpoints outside the VCS (such as endpoints of services other than the VCS, endpoints in client-owned networks, or endpoints within the public Internet), an encapsulation protocol may be implemented in various embodiments. The virtualization hosts may comprise respective encapsulation protocol processing components (EPPCs), e.g., for performing address translations between GVM addresses and host addresses, generating the contents of various encapsulation headers appropriately, and/or for other tasks required by the encapsulation protocol in such embodiments. EPPCs may sometimes also be referred to as encapsulation endpoints, encapsulation managers or network virtualization managers. Corresponding to a message generated by an application process running at a particular source GVM, and directed towards a different application process running at a different destination GVM, the networking software stack of the source GVM may generate a baseline network packet. The term "baseline" may be used herein to refer to network packets that are generated at GVMs and that have not been encapsulated within larger packets by EPPCs. The EPPC at the virtualization host of the source GVM may be responsible for enveloping the outbound baseline network packet within a corresponding encapsulation packet, identifying a destination such as a different virtualization host or an edge router to which the encapsulation packet is to be sent, and transmitting the encapsulation packets on a path to the destination. An EPPC at a virtualization host may also be responsible for receiving inbound encapsulation packets (containing baseline packets directed to GVMs instantiated at the host), extracting the baseline packets from the encapsulation packets, and passing the baseline packets on to the destination GVMs.

In at least some embodiments, a virtualization host may comprise one or more virtualization management components such as a hypervisor and/or a privileged-domain operating system, responsible for acting as intermediaries between the GVMs of the host and the hardware devices of the host. An EPPC may be incorporated within the virtualization management components of a virtualization host in such embodiments. In at least one embodiment, one or more of the virtualization hosts may be equipped with a network processing peripheral device to which at least a portion of the networking-related workload can be offloaded from the CPUs or cores of the virtualization hosts, and an EPPC may be implemented at least in part at such a peripheral device. In various embodiments, similar EPPCs may also be incorporated within edge routers and/or other devices of the VCS. For example, an edge router's EPPC may be responsible for extracting, from an encapsulation packet prepared by an EPPC at a source virtualization host, a baseline packet directed to an address outside the VCS, and formatting the baseline packet appropriately for the networking protocol to be used to transmit the packet onwards towards its destination. In some embodiments, an edge router's EPPC may be responsible for protocol translation. For example, for outbound packets from a GVM, an edge router's EPPC may transform contents of one encapsulation packet (formatted according to the encapsulation protocol used internally within the VCS) into a different encapsulation packet (formatted according to a different encapsulation protocol or tunneling protocol used outside the VCS), or for transmitting the extracted baseline packet without encapsulation towards its destination. The reverse translation may be performed for inbound packets directed towards GVMs—e.g., the EPPC at the edge router may prepare an encapsulation packet containing an inbound baseline packet and transmit it to the appropriate virtualization host. In one embodiment, EPPCs may also be incorporated within other devices of the VCS, such as internal routers, load balancers and the like.

In various embodiments, a network health management service (NHMS) for a VCS may analyze information collected at the EPPCs using the VCS's encapsulation protocol to determine the relative health status and performance of various components of the VCS. The NHMS may comprises a plurality of health analyzer nodes distributed among various data centers used for the VCS in some implementations. The NHMS nodes may perform detailed analysis on the aggregated network metrics collected by the numerous EPPCs, initiate follow-up actions such as the collection of additional types of metrics or route information if a network performance problem is indicated, and initiate remedial actions if and when the existence of network problems is confirmed.

In some embodiments, a packet tracking session may be established between a pair of EPPCs, e.g., at the initiative of one of the EPPCs (which may be referred to as a transmitter or TX EPPC) of the pair. In some cases, a given EPPC (e.g., at a virtualization host, or at another device of the VCS such as an edge router) may be responsible for initiating packet tracking sessions on its own initiative, based on various tracking triggering criteria such as the availability of tracking resources, the amount of outbound and/or inbound traffic being handled at the EPPC, and so on. The other participant EPPC of a packet tracking session, which agrees to participate in the session requested by the TX EPPC, may be referred to as a receiver (RX) EPPC herein. It is noted that the labels "transmitter" and "receiver", while indicative of the initiator of the session and the responder to the initiator respectively, are not intended to suggest that customer traffic flows only in one direction between the two EPPCs participating in a packet tracking session. In at least some embodiments, packet tracking sessions may be initiated by a given EPPC at the request of nodes (such as back-end health analyzer nodes responsible for evaluating health metrics collected by the EPPCs and taking follow-on actions) of the network health management service of the VCS, e.g., in addition to or instead of being initiated by the EPPCs themselves.

A number of different criteria may be used by a potential TX EPPC to determine when to initiate a new packet tracking session, and/or to identify the peer EPPC (the proposed RX EPPC) with which to attempt to establish a new packet tracking session. In some embodiments, a respective pool of tracking resources (e.g., memory regions or data structures) may be accessible at a given EPPC, and the EPPC may be responsible for initiating a new session when it detects that enough tracking resources for the new session are available. The proposed RX EPPC with which the session is requested may be selected based on any combination of a number of factors in different embodiments: e.g., the length of a time interval during which encapsulation packets have been transmitted between the TX EPPC and the proposed RX EPPC, the number of encapsulation packets which have been transmitted between the two EPPCs, the number of bytes which have been transmitted between the two EPPCs during a particular time interval, or length of a time interval during which a packet tracking session has not been established between the two EPPCs (i.e., how long it has been since a session between the TX EPPC and the proposed RX EPPC was established in the past, if any such session had been established at all).

A handshake procedure involving at least one message transmitted from the TX EPPC to the proposed RX EPPC, and a response received at the TX EPPC from the proposed RX EPPC, may be used to establish the packet tracking session in some embodiments. The two participant EPPCs in the session may exchange various types of information during the handshake as discussed below in further detail, such as the respective capabilities of the EPPCs regarding route variation, the relative priority of the packet tracking session, and the like. Before accepting a session establishment request, the proposed RX EPPC may check whether it has enough free tracking resources for the new session in various embodiments. If it does not have enough tracking resources, or if the capabilities of the proposed RX EPPC do not meet the criteria of the TX EPPC, a packet tracking session may not be established. If, in a scenario in which a session cannot be established with a given proposed RX EPPC, the TX EPPC is able to identify an alternate candidate RX EPPC, the handshake for a new session may be initiated with the alternate candidate RX EPPC in some embodiments, until either a session is successfully established or the TX EPPC runs out of suitable candidates.

After the session establishment handshake procedure is completed successfully, the TX EPPC may start tagging some or all of the encapsulation packets prepared for transmitting baseline packets to the RX EPPC as tracked packets. The encapsulation packets may be designated as tracked or untracked by setting a value of one of the encapsulation protocol headers (or some particular bit sequence of the encapsulation packets) appropriately in some embodiments. In other embodiments, once a packet tracking session is established between a TX EPPC T1 and an RX EPPC R1, all the encapsulation packets containing baseline packets sent from T1 to R1 may be considered to be tracked, e.g., without using particular bit sequences or header values to distinguish tracked packets from untracked packets. The TX EPPC may record how many tracked packets are sent during the session to the RX EPPC, the total number of bytes sent, etc. At the RX EPPC, any combination of a number of different metrics may be collected for a given packet tracking session. For example, the number of tracked packets received, the number of corrupted packets received, the number of packets received out of order, the number of explicit congestion notifications (ECNs) received, or one or more latency metrics may be stored using the tracking resources of the RX EPPC which have been reserved for the session. As new tracked packets are sent by the TX EPPC and received at the RX EPPC, the corresponding metrics stored at the TX EPPC and the RX EPPC respectively may be updated. In some embodiments, the fraction of packets that are tagged as tracked packets by the TX EPPC during different phases of a tracking session may be varied, e.g., based on configurable parameters, analysis of the metrics collected thus far during the session by the TX EPPC, or for other reasons.

At one or more points during the session, and/or at the end of the session, the TX EPPC may transmit a tracking metrics synchronization request to the RX EPPC. In response, the RX EPPC may transmit some or all of the metrics collected thus far for the session back to the TX EPPC. In some embodiments, such synchronization requests may be sent at regular intervals, e.g., once every T seconds, while in other embodiments the requests may be scheduled based on configurable criteria such as the total number of packets that have been tracked since the last synchronization request, the total number of transferred bytes of data during the session, etc.

The TX EPPC may be responsible for transmitting network health update messages, pertaining to traffic tracked during various sessions initiated by the TX EPPC, to health analyzers and/or other components of the VCS network health management service for more thorough analysis in some embodiments. In one embodiment, upon obtaining the next batch of metrics from the RX EPPC, the TX EPPC may make a decision (e.g., based on the ratio between the number of packets received at the RX EPPC without any problems and the total number of packets sent to the RX EPPC from the TX EPPC) as to whether a network health update based on the received metrics should be transmitted. In other embodiments, the TX EPPC may transmit updates to the service without making any particular determination as to whether additional analysis of the state of the network components used for the session is required or not. Network health updates messages sent by the TX EPPCs may also be referred to herein as network status update messages.

After receiving one or more network health update messages from TX EPPCs, in some embodiments nodes of the VCS network health management service (NHMS) may decide whether the metrics indicated in the update messages warrant the collection of additional information. For example, metrics collected from numerous TX EPPCs may be aggregated, correlated and/or otherwise processed to determine whether there appears to be sufficient evidence of a potential network impairment (such as a faulty link or misbehaving internal router) which may require remedial actions. In various embodiments, a set of additional metrics and/or configuration details (e.g., the actual router-to-router hops traversed by packets between a pair of EPPCs, which may be obtained by an EPPC of the pair using the equivalent of a "traceroute" command) required to more thoroughly investigate the potential impairment may be identified at the service. One or more follow-up requests may be directed to sources (including, for example, EPPCs that have already been collecting network metrics for tracking sessions using encapsulation headers, EPPCs that are currently not tracking encapsulation packets, internal routers, and the like) from which the desired metrics can be obtained, containing directives or instructions regarding the particular metrics to be obtained. In at least one embodiment, the directives may indicate the particular bit sequences (e.g., encapsulation headers and/or specific header values) to be used to collect the additional metrics. In some cases, the follow-up requests may request additional data points for a pair of EPPCs which had already established tracking sessions—e.g., more of the packets may be tracked, or a traceroute command may be run to identify the network links being used. In other cases, new tracking sessions may be established (e.g., at a high priority, which may require the freeing of tracking resources which are currently in use for other sessions) as a result of a follow-up request from the NHMS.

The data collected in the follow-up phase may be transmitted back to the NHMS by the metrics sources. After analyzing the additional metrics, the NHMS component(s) may in some cases conclude that a network impairment or failure scenario has occurred, and initiate one or more remedial actions. Such remedial actions may include, for example, generating alerts to VCS administrators, shutting down suspect network devices or links, changing routing metadata to bypass suspect devices or links, and so on.

In at least one embodiment, a number of alternative parallel pathways may be available between a given pair of EPPCs, e.g., based on the input port counts and output port counts fan-out of various networking devices of the VCS including switches, routers and the like. The particular next hop taken by a given encapsulation packet from a given VCS host or networking device on its way from a TX EPPC T1 to an RX EPPC R1 may be selected based on a hash function to which various encapsulation header values are fed as input in some implementations. For example, in an implementation in which encapsulation packets are sent via UDP (the User Datagram Protocol), the 5-tuple [IP protocol identifier, source IP address, destination IP address, source UDP port, destination UDP port] may be hashed to select a particular equal-cost link to be used as a next hop. The elements of such a tuple may be considered route variation parameters, and one or more of the route variation parameter values may be changed by a TX EPPC during a packet tracking session in some embodiments to modify the pathway taken for at least some of the subsequent packets of the session. In some embodiments, a follow-up request from an NHMS component to a given TX EPPC may include a request to change the route used for tracked packets by setting a route variation parameter. In other embodiments, a TX EPPC may change route variation parameters on its own, e.g., in an effort to balance traffic across various available network links.

In some embodiments in which route variation is supported during a packet tracking session, at least some of the metrics (e.g., total number of packets sent/received, dropped packets, etc.) may be collected on a per-route basis. For example, when providing its collected metrics to a TX EPPC in response to a tracking synchronization request, the RX EPPC may include one subgroup of metrics for route Rte1 (corresponding to a particular route variation parameter setting), another subgroup of metrics for route Rte2 (corresponding to a different route variation parameter setting), etc. The network health state messages sent by the TX EPPCs to the NHMS may also contain route-level metrics in some embodiments. If the route taken by packets between EPPCs T1 and R1 is changed by setting a UDP source port in the 5-tuple [IP protocol identifier, source IP address, destination IP address, source UDP port, destination UDP port], for example, separate sets of metrics may be collected for each different UDP source port value used during the session. By varying the routes used for encapsulation packets, the task of identifying suspect network links and intermediary devices (i.e., links or routers that may not be performing at their expected capacity) may become easier for the NHMS, as described below in further detail. Additional details regarding the functions and operations of various VCS components which participate in network health metrics collection and network health management are also provided below.

Example System Environment

FIG. 1 illustrates an example system environment in which a packet tracking algorithm involving the use of encapsulation protocol headers may be implemented at a virtualized computing service, according to at least some embodiments. In system 100, virtual computing service (VCS) 142 is implemented using resources of a provider network 102. A number of other network-accessible services, such as storage service 151 (which may for example expose block level device interfaces for storage volumes, or web services interfaces for unstructured storage objects), a database service 152, a machine learning service 153, and so on, may also be implemented at the provider network in the depicted embodiment. Networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in this document. A provider network may also sometimes be referred to as a "public cloud" environment. A given provider network may include numerous data centers hosting various resource pools, such as collections of physical and/or virtualized computer servers, storage devices, networking equipment and the like, needed to implement, configure and distribute the infrastructure and services offered by the provider. Within large provider networks, some data centers may be located in different cities, states or countries than others, and in some embodiments the resources allocated to a given application may be distributed among several such locations to achieve desired levels of availability, fault-resilience and performance.

In at least some embodiments, at least some resources of the VCS such as virtualization hosts (VHs) 130A, 130B and 130C may be distributed among one or more isolated virtual networks (IVNs) such as IVNs 125A and 125B established at the request of VCS clients. Within a given IVN 125, the client on whose behalf the IVN has been established may be granted substantial flexibility with respect to networking configurations—e.g., the client may choose a range of private IP addresses from which particular addresses are to be assigned to various guest virtual machines (GVMs) 112 of the IVN, configure subnets, establish security rules for incoming and outgoing traffic, set up routing table entries, and so on. The private IP addresses assigned within a given IVN 125 may not be accessible (at least by default) outside that IVN; as a result, the client may choose arbitrary IP addresses for the GVMs without having to be concerned about the possibility of duplicating addresses already assigned outside the IVN. In general, IVN capability may enable VCS clients to set up networking configurations as though they were using client-owned resources, while benefiting from the scaling, availability and pricing-related advantages made possible by the provider network. IVNs may also be referred to as "virtual private clouds" in some provider network environments. It is noted that in some embodiments, the kinds of encapsulation protocol-based network packet tracking algorithms and network health management techniques described herein may be employed even if IVNs are not implemented—that is, the techniques and algorithms for network metrics collection and analysis discussed herein may not necessarily require IVNs to be supported.

In the embodiment shown in FIG. 1, IVN 125A comprises a plurality of virtualization hosts 130, including VH 130A and VH 130B, while IVN 125B comprises VH 130C. Each VH 130 may include a respective virtualization management component (VMC) 115, such as VMCs 115A, 115B and 115C. A VMC 115 may comprise, for example, a hypervisor and/or an instance of an operating system running in an administrative domain (sometimes referred to as "dom-0"). In addition to the VMC 115, each VH 130 may have the resource capacity (e.g., processing capabilities, memory, storage etc.) to instantiate one or more GVMs 112. VH 130A, for example, is shown with three GVMs 112A, 112B and 112C; VH 130B has GVMs 112K and 112L, while GVM 112Q is instantiated at VH 130C. In addition to the virtualization hosts 130, a VCS 142 may also contain various other components including edge routers 128 and back end health analyzer nodes 126 (e.g., 126A and 126B) of a network health management service 158 in the depicted embodiment.

In order to facilitate traffic between GVMs 112 instantiated at different virtualization hosts 130 (and between the GVMs 112 and entities outside the VCS 142, such as various network endpoints of services 151, 152 or 153, as well as endpoints outside the provider network 102), an encapsulation protocol may be implemented at various devices of the VCS 142. Software and/or hardware components responsible for implementing the encapsulation protocol, labeled encapsulation protocol processing components (EPPCs) 117, are shown incorporated within VMCs 115, network processing peripheral devices such as device 133, and within edge router 128 in system 100. For example, VMC 115A of VH 130A includes EPPC 117A, VMC 115B includes EPPC 117B, network processing peripheral device 133 includes EPPC 117C, and edge router 128 includes EPPC 117K. A virtualization host such as VH 130C may be equipped with a network processing peripheral device 133 in some embodiments so that, for example, some of the computing workload associated with implementing one or more network protocols (such as the encapsulation protocol itself and/or the underlying Transmission Control Protocol (TCP), User Datagram Protocol (UDP) or Internet Protocol (IP)) can be offloaded from the main CPUs or cores of the virtualization host. In some embodiments, the network processing peripheral device may be attached via the Peripheral Component Interconnect Express (PCI-Express) bus or another similar bus. In one embodiment, a customized or enhanced network interface card may serve as the network processing peripheral device for some virtualization hosts. In embodiments in which network processing peripheral devices are used at one or more virtualization hosts, some of the networking-related responsibilities of the hypervisor and/or administrative domain operating system which constitute the VMCs of the hosts may be delegated or offloaded to the peripheral devices, and as a result more of the processing capabilities of the CPUs/cores of the hosts may become available for guest virtual machines.

According to the encapsulation protocol, a message generated at an application process executing at a particular GVM (e.g., GVM 112C) of a particular virtualization host (e.g., VH 130A) and directed to an application process at a different GVM (e.g., GVM 112L) at a different virtualization host (e.g., VH 130B) may be included in an outbound baseline packet OBP1 at the networking software stack of the source GVM 112C. The dashed arrow labeled 166B indicates that customer data (i.e., messages generated at the application level) is being transmitted between GVM 112C and GVM 112L in the example scenario illustrated in FIG. 1. The term "baseline" is used herein to refer to the packets generated at or received by the networking software stacks of various GVMs, as opposed to the typically larger "encapsulation" packets described below, which are generated by the EPPCs 117. (In some cases, of course, a message may be large enough to require multiple baseline packets, in which case each of the multiple baseline packets may be encapsulated similarly.) Assuming that an IP-based networking protocol is used for GVM-to-GVM communication, the outbound baseline packet OBP1 may indicate an IP address GVMAddr1 assigned to GVM 112C as the source IP address, and an IP address GVMAddr2 assigned to GVM 112L as the destination address. In various embodiments, the IP address assigned to a GVM (or, more specifically, to a virtual network interface associated with the GVM) may typically differ from the IP address assigned to the virtualization host at which that GVM runs. For example, VH 130A may have an address VHAddr1 assigned to it, and VH 130B may have address VHAddr2 assigned to it. In order to route GVM-to-GVM packets correctly, network mappings indicating the relationship between GVMs and virtualization hosts, as well as route tables set up for the IVNs 125 may be used, e.g., as part of the encapsulation protocol.

In the example where the outbound baseline packet OBP1 is created at GVM 112C of VH 130A, the virtualization management component VMC 115A of VH 130A may intercept OBP1, and a corresponding outbound encapsulation packet OEP1 may be prepared by EPPC 117A. OEP1 may include one or more headers defined by the encapsulation protocol, for example, and the body of OEP1 may include OBP1. In at least some embodiments, OEP1 may indicate host address VHAddr1 as a source address, and VHAddr2 (or some intermediary address on a route towards VH2) as a destination address. OEP1 may be transmitted using VH 130A's physical network interface card (NIC) on its path towards VH 130B. When OEP1 reaches VH 130B, EPPC 117B of the VMC 115B may examine its contents, and the baseline packet contained in OEP1 may be provided to GVM 112L. A similar encapsulation technique may be employed for inbound packets with respect to a given GVM 112 (e.g., a baseline packet generated at GVM 112L may be incorporated within an encapsulation packet generated by EPPC 117B of VMC 115B, received and validated at EPPC 117A of VMC 115A, extracted and passed on to GVM 112C).

In the scenario depicted in FIG. 1, customer data traffic (e.g., encapsulation packets containing baseline packets generated at GVMs 112, or directed to GVMs 112) flows between GVMs 112C and 112L, GVMs 112K and 112Q, and GVM 112B and service storage service 151 via edge router 128, as indicated by arrows 166B, 166C and 166A respectively. In general, customer traffic may flow between any two GVMs, or between any given GVM and devices external to the VCS 142. Corresponding to at least some pairs of such communicating endpoints, respective packet tracking sessions 167 may be established between the EPPCs involved. For example, packet tracking session 167A has been established between EPPC 117A of VH 130A and EPPC 117K of edge router 128, and packet tracking session 167B has been established between EPPC 117B of VH 130B and EPPC 117C of VH 130C. Each session 167 may be established at the request of one of the EPPCs of the pair of EPPCs participating in the session. The EPPC requesting the session may be referred to as the "transmitter" or "TX" EPPC of the session, while the EPPC accepting the session establishment request may be referred to as the "receiver" or "RX" EPPC of the session.

Any of a number of criteria may be used to determine if and when a given EPPC should attempt to establish (as the TX EPPC) a packet tracking session, and the particular peer EPPC which should be selected as the potential RX EPPC of the session. For example, as discussed below in the context of FIG. 3, each EPPC may have a fixed-size pool of tracking resources (e.g., units of memory), such that a selected subset of resources of the pool has to be reserved for any given session. An EPPC may attempt to establish a new packet tracking session, for example, if a tracking resource of the pool has recently been freed as result of a termination of another packet tracking session, or based on other criteria. The peer EPPC which is to assume the role of RX EPPC may also be selected based on any combination of several criteria, such as the length of a time interval during which at least some encapsulation packets have been transmitted per minute or second between the TX EPPC and the proposed RX EPPC, the number of encapsulation packets which have been transmitted between the two EPPCs, the number of bytes which have been transmitted between the two EPPCs during a particular time interval, or the length of a time interval elapsed since a previous session between the two EPPCs ended. Not all communicating EPPC pairs may have corresponding tracking sessions established at a given point in time in system 100; for example, no session is shown for the EPPC pair (EPPCs 117A and 117B) corresponding to customer data path 166B. Depending on the communication needs of the applications which are being run at the virtualization hosts of the VCS, and the constraints on tracking resources available at the EPPCs, it may sometimes be the case that packet tracking sessions can be set up for only a fraction of the communicating EPPC pairs of the VCS at a given point in time. For example, a given EPPC may be transmitting encapsulation packets to hundreds of destinations, but may be limited to participating in eight or sixteen tracking sessions at a time.

The session-initiating or TX EPPC may transmit an encapsulation packet to the proposed RX EPPC as part of a handshake procedure in the depicted embodiment, using one or more encapsulation headers or encoded bit sequences to request the participation of the RX EPPC in the session. Details of the request and response packets of the handshake are provided below. After the session is established, the TX EPPC may tag some or all of the encapsulation packets (which contain embedded baseline packets) as packets to be tracked. A number of metrics may be maintained regarding the tracked packets at the RX EPPC and/or at the TX EPPC, such as the total number of packets sent, the total amount of data sent, the number of dropped or corrupted packets received, the number of out-of-order packets received, the latency associated with a particular route used for the packets relative to other routes, etc. Periodically, or in response to triggering conditions, the TX EPPC of a session 167 may request that the metrics collected thus far at the RX EPPC be transmitted back to the TX EPPC. The TX EPPC may send network health update messages, whose contents are based at least in part on the network metrics obtained from the RX EPPC, to one or more of the back end health analyzer nodes 126 of the NHMS 158 in the depicted embodiment. The scheduling of the network health update messages may be based on various parameters in different embodiments: e.g., one update message may be sent per set of metrics received from the RX EPPC, or update messages may be sent based on a preliminary analysis of the metrics obtained from the RX EPPC, or update messages may be sent in response to requests from the NHMS 158.

The contents of the update messages sent by a given EPPC 117 may be analyzed at the NHMS 158 (e.g., after combining and/or correlating contents of numerous such update messages obtained from various EPPCs) to determine if follow-up actions should be taken. For example, if it appears that a network impairment event (e.g., a failure of a particular intermediary network device or link between one or more pairs of EPPCs) may have occurred, a back end NHMS health analyzer node 126 may transmit a request for additional metrics to one or more EPPCs (and/or to other devices of the VCS). The follow-up message prepared by the NHMS may request a new set of metrics, more data points representing metrics that are already being collected, configuration details such as output from the equivalent of a traceroute command, etc. The recipients of the follow-up requests may obtain the requested metrics (e.g., using existing packet tracking sessions or new sessions established in response to the follow-up requests) and pass them back to the NHMS. If an actual network impairment event is detected, the NHMS may initiate one or more remedial actions, such as shutting down a faulty device, reconfiguring routing tables, generating alerts for administrators, and the like.

In various embodiments, some or all of the messages exchanged between EPPCs to set up, terminate, or change the parameters of network packet tracking sessions and/or for reporting of collected metrics may themselves be contained in encapsulation protocol headers. In some embodiments, encapsulation packets used for such administrative operations may not necessarily contain baseline packets generated by or for the GVMS 112. Thus, some session management messages may be piggybacked onto encapsulation packets which also carry customer data (baseline packets), while other session management messages may not contain baseline packets. The tracked packets (the ones for which metrics such as corrupted packet counts or dropped packet counts are collected) may typically contain baseline packets containing customer data. At least some communications between the EPPCs and the NHMS may also be implemented using packets formatted according to the encapsulation protocol in various embodiments. By tracking encapsulation packets used for customer data, a more representative measure of the performance being experienced by client applications of the VCS may be obtained than may have been possible if health monitoring agents that use heartbeat messages or pings were the only source of network health information.

Packet Flow Between GVMs at Different Virtualization Hosts

Figure 2:
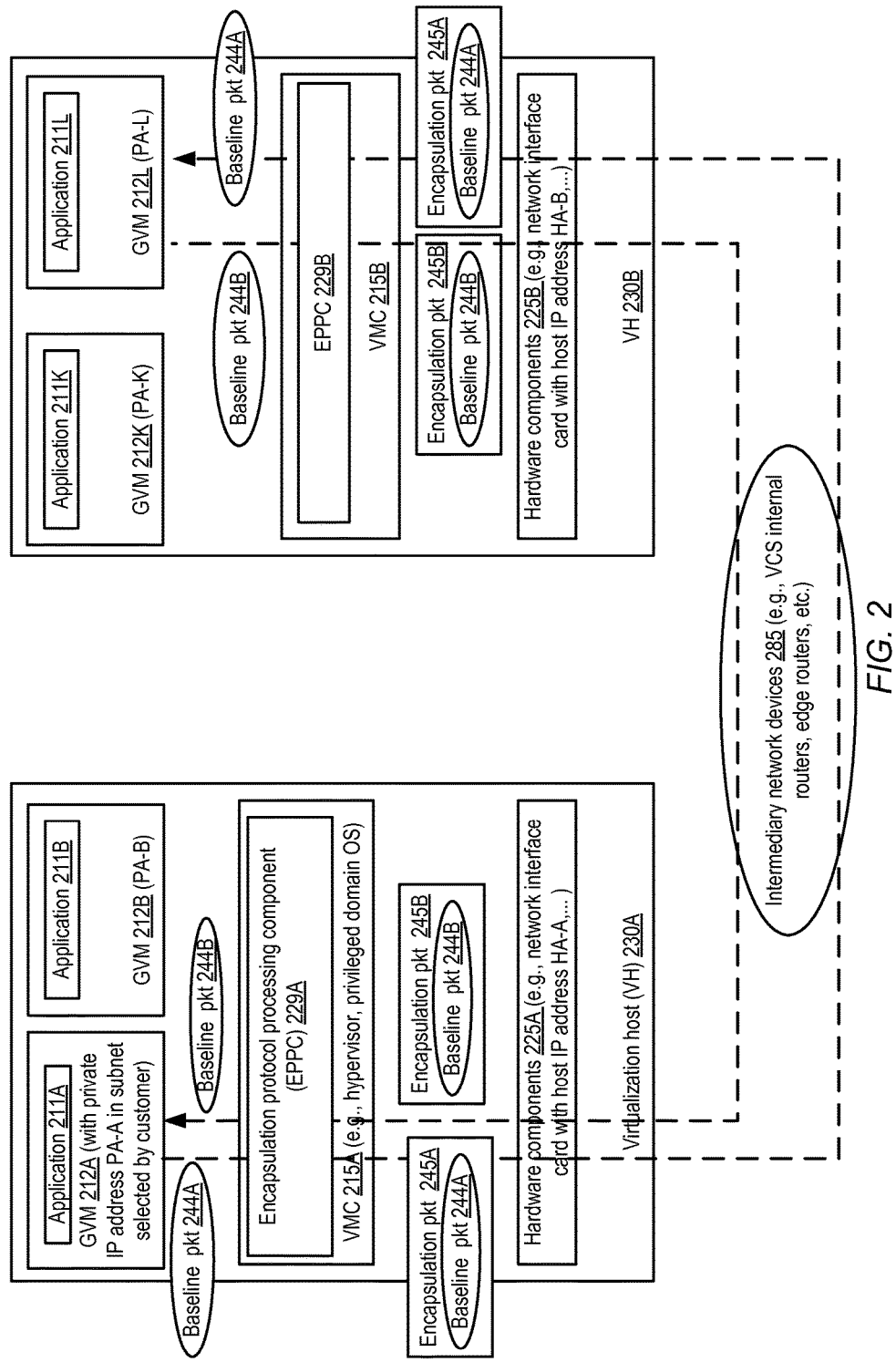
FIG. 2 provides an overview of network packet flow between virtual machines instantiated at different virtualization hosts, according to at least some embodiments.

FIG. 2 provides an overview of network packet flow between virtual machines instantiated at different virtualization hosts, according to at least some embodiments. Two virtualization hosts VH 230A and VH 230B of a virtual computing service (VCS) are shown. Both of the VHs 230 may be used for GVMs of the same isolated virtual network (IVN) in the depicted example, although similar packet flow paths may be used even if the two VHs are used at different IVNs, or if IVNs are not used at all. Each virtualization host may comprise one or more guest virtual machines, such as GVMs 212A and 212B at VH 230A, and GVMs 212K and 212L at VH 230B. In the depicted embodiment, each GVM 212 may be assigned at least one private IP address (such as PA-A, PA-B, PA-K or PA-L for GVMs 212A, 212B, 212K and 212L respectively), e.g., from the range of addresses of a subnet previously set up by the customer on whose behalf the IVN containing the GVM is established. For example, if the IP address range (expressed in Classless Inter-Domain Routing or CIDR format) 10.0.0.0/16 is designated for the IVN, and GVMs 212A and 212B are set up in a subnet 10.0.1.0/24, then GVM 212A and 212B may each be assigned a different address in the range 10.0.1.0-10.0.1.255. The addresses may be designated as "private" in the depicted embodiment because they are not (at least by default) advertised outside the IVN. It is noted that at least in some embodiments, a private IP address (as the term is used in this document) may not necessarily be compliant with some or all of the IETF (Internet Engineering Task Force) standards pertaining to address allocation for private networks, such as RFC (Requests for Comments) 1918 (for IP version 4) or RFC 4193 (for IP version 6).

Each GVM 212 may comprise one or more application processes 211 in the depicted embodiment, such as applications 211A, 211B, 211K or 211L. A given application such as 211A may generate messages to be sent to other applications, such as 211L. Such an application message may be incorporated within one or more baseline network packets (such as packet 244A, in the case of application 211A) prepared by the networking software stack of the operating system at the GVM where the application runs. The baseline packet may, for example, indicate the private address of the sending GVM (e.g., PA-A) as the source IP address, and the private address of the intended recipient GVM (e.g., PA-L) as the destination IP address. The baseline packet may be transmitted by the low level components of the GVM's networking software stack via a virtual network interface associated with the GVM. The VMC 215 at the virtualization host where the GVM runs (e.g., VMC 215A, which may comprise a hypervisor and/or an administrative domain operating system), which acts as the intermediary between the GVM and hardware devices 225A, may intercept such a baseline packet 244A. The EPPC 229A of VMC 215A may include the contents of the baseline packet within an encapsulation packet 245A. As discussed earlier, an encapsulation protocol may be employed in the VCS because the addresses of the GVMs may have to be mapped to the addresses of the virtualization hosts at which the GVMs are instantiated for the transmission of the packets along the routes needed to reach their destinations. For example, VH 230A has a network interface card with host IP address HA-A, and VH 230B has a network interface card with host IP address HA-B, while the respective GVMs established at the hosts 230 have different IP addresses from the range selected by the customer. The VMC 215A may determine the route over which the encapsulation packet 245A should be sent using route tables of the IVN, network mappings and/or other VCS networking configuration metadata (which may comprise identifiers/addresses of gateways and other devices, etc.). The encapsulation packet 245A may indicate VH 230A's host IP address HA-A as the source, and the targeted VH 230B's host IP address HA-B as the destination (although in some cases the destination address indicated in the encapsulation packet may be an address assigned to an intermediary device at which the address of VH 130B may be available). The encapsulation packet 245A may be transmitted along the appropriate route towards VH 230B, e.g., a route which may include various intermediary devices 285 such as routers, tunneling devices, etc.

The encapsulation packet 245A may eventually be received at the network interface card (one of the hardware components 225B) of virtualization host 230B. The encapsulation packet 245A may be processed by the EPPC 229B of VMC 215B. EPPC 229B may unpack the contents of the encapsulation packet 245A. The original baseline packet 244A extracted from encapsulation packet 245A may be passed on to the GVM 212L at which the destination application 211L runs. Packets generated at the application 211L and intended for application 211A may follow the reverse path to that used for baseline packet 244A. For example, a baseline packet 244B (generated at GVM 212L) with a source IP address PA-L and destination IP address PA-A may be intercepted and encapsulated by EPPC 229B, and a corresponding encapsulation packet 245B may be prepared and transmitted using intermediary devices 285. That encapsulation packet 245B, with a HA-B as its source address and HA-A (or an intermediary device address) as its destination address, may eventually reach VH 230A. At VH 230A, EPPC 229A of VMC 215A may extract baseline packet 244B from encapsulation packet 245B and transfer it to GVM 212A. As described below in further detail, a number of different encapsulation protocol header values or bit sequences may be set by the EPPCs 229 for establishing packet tracking sessions, tracking packets during the sessions, obtaining metrics at a TX EPPC of a session from the RX EPPC for the session, and so on. As mentioned earlier, in some embodiments at least a portion of the EPPC functionality discussed in the context of FIG. 2 may be implemented or executed at peripheral networking processing devices of the virtualization hosts, e.g., instead of being implemented within a hypervisor or administrative domain operating system.

Packet Tracking Sessions and Resources

Figure 3:
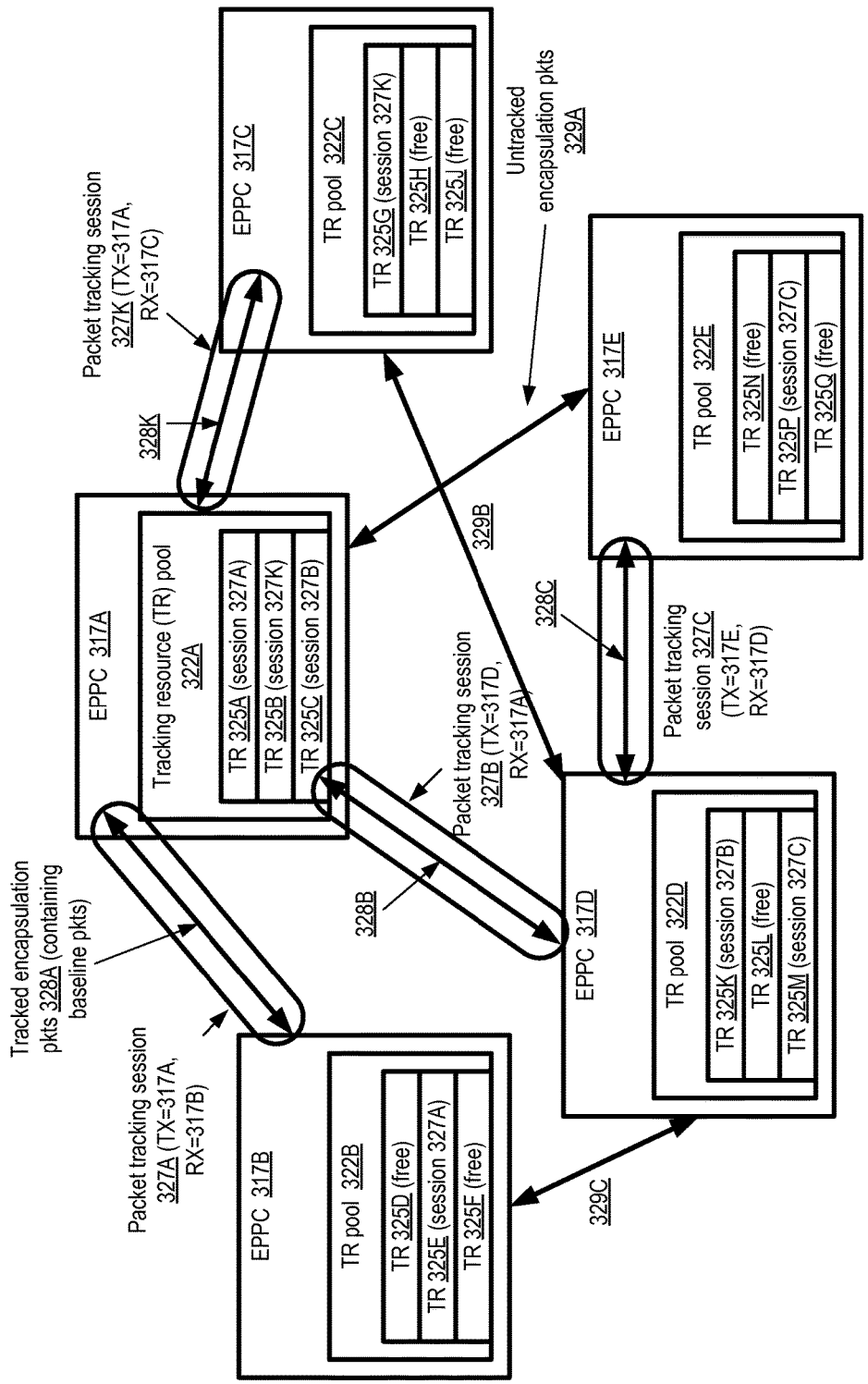
FIG. 3 provides examples of packet tracking sessions which may be established among pairs of encapsulation protocol processing components of a virtualized computing service, according to at least some embodiments.

FIG. 3 provides examples of packet tracking sessions which may be established among pairs of encapsulation protocol processing components of a virtualized computing service, according to at least some embodiments. Five EPPCs 317A-317E are shown, several of which are transmitting encapsulation packets to other EPPCs (as indicated by arrows labeled 329 for untracked packets and arrows labeled 328 for tracked packets). For example, EPPCs 317A and 317D are both communicating with all four of the other EPPCs, while EPPCs 317B, 317C and 317E are each communicating with two EPPCs (317A and 317D). One or more of the EPPCs 317 may be incorporated within virtualization management components or peripheral devices of VCS virtualization hosts, and one or more of the EPPCs 317 may be incorporated within VCS edge routers or other encapsulation endpoints of the VCS.

As shown in FIG. 3, each EPPC has a finite pool 322 of tracking resources (e.g., pools 322A-322E at EPPCs 317A-317E respectively), from which one tracking resource 325 is consumed per active packet tracking session in which the EPPC is a participant. To avoid clutter, only three tracking resources 325 are shown per EPPC in FIG. 3; in practice, any desired number of tracking resources may be configured for each of the EPPCs, and different EPPCs may have different numbers of tracking resources. A given tracking resource 325 may comprise, for example, enough memory to store metrics and associated metadata for a single packet tracking session (either for an EPPC acting as a TX EPPC, or as an RX EPPC) in the depicted embodiment. The type of memory used for tracking resources may vary from one implementation to another—in some cases, volatile memory or main memory of a host or edge router may be used, a memory subcomponent of a network processing peripheral device may be used, persistent or non-volatile storage devices may be used, or a combination of various types of devices may be used. In some embodiments, resources other than memory may be reserved for each tracking session—e.g., a tracking resource could comprise a thread of execution, or a number of processor cycles, in addition to or instead of a section of memory.

Four packet tracking sessions 327A, 327B, 327C and 327K have been established in the scenario depicted in FIG. 3. With respect to session 327A, EPPC 317A is the TX or session-initiating EPPC, while EPPC 317B is the RX EPPC. Tracking resources 325A (of EPPC 317A) and 325E (of EPPC 317B) are reserved for session 327A. With respect to session 327B, EPPC 317A is the RX EPPC, while EPPC 317D is the TX EPPC. Tracking resources 325C (of EPPC 317A) and 325K (of EPPC 317D) are reserved for session 327B. With respect to session 327C, EPPC 317D is the RX EPPC, while EPPC 317E is the TX EPPC. Tracking resources 325P (of EPPC 317E) and 325M (of EPPC 317D) are reserved for session 327C. Finally, session 317K has been established with EPPC 317A as the TX EPPC and EPPC 317C as the RX EPPC, with tracking resources 325B (at EPPC 317A) and 325G (at EPPC 317C) designated for session 317K. As shown, a given EPPC (such as EPPC 317A) may concurrently act as a TX EPPC for some sessions and an RX EPPC for other sessions in the depicted embodiment. Not all the tracking resources of a given EPPC may necessarily be in use at a given point in time. Some EPPCs which have free tracking resources (such as EPPC 317B in FIG. 3) and are sending untracked packets (e.g., packets 329C in the case of EPPC 317B) to another EPPC (e.g., EPPC 317D) may nevertheless refrain from setting up a tracking session, for example because the volume of traffic is too low, because a previous tracking session with the peer EPPC has recently concluded, or for other reasons. In various embodiments, an EPPC implemented at any of the types of devices which support EPPC functionality (e.g., a virtualization host, an edge router, or other devices at which encapsulation-related processing can be performed) may act as a TX EPPC and/or as an RX EPPC—that is, the type of device used for an EPPC may impose no restrictions on the kinds of roles that can be played by the EPPC with respect to packet tracking sessions.

Encapsulation Packet Categories

Figure 4:
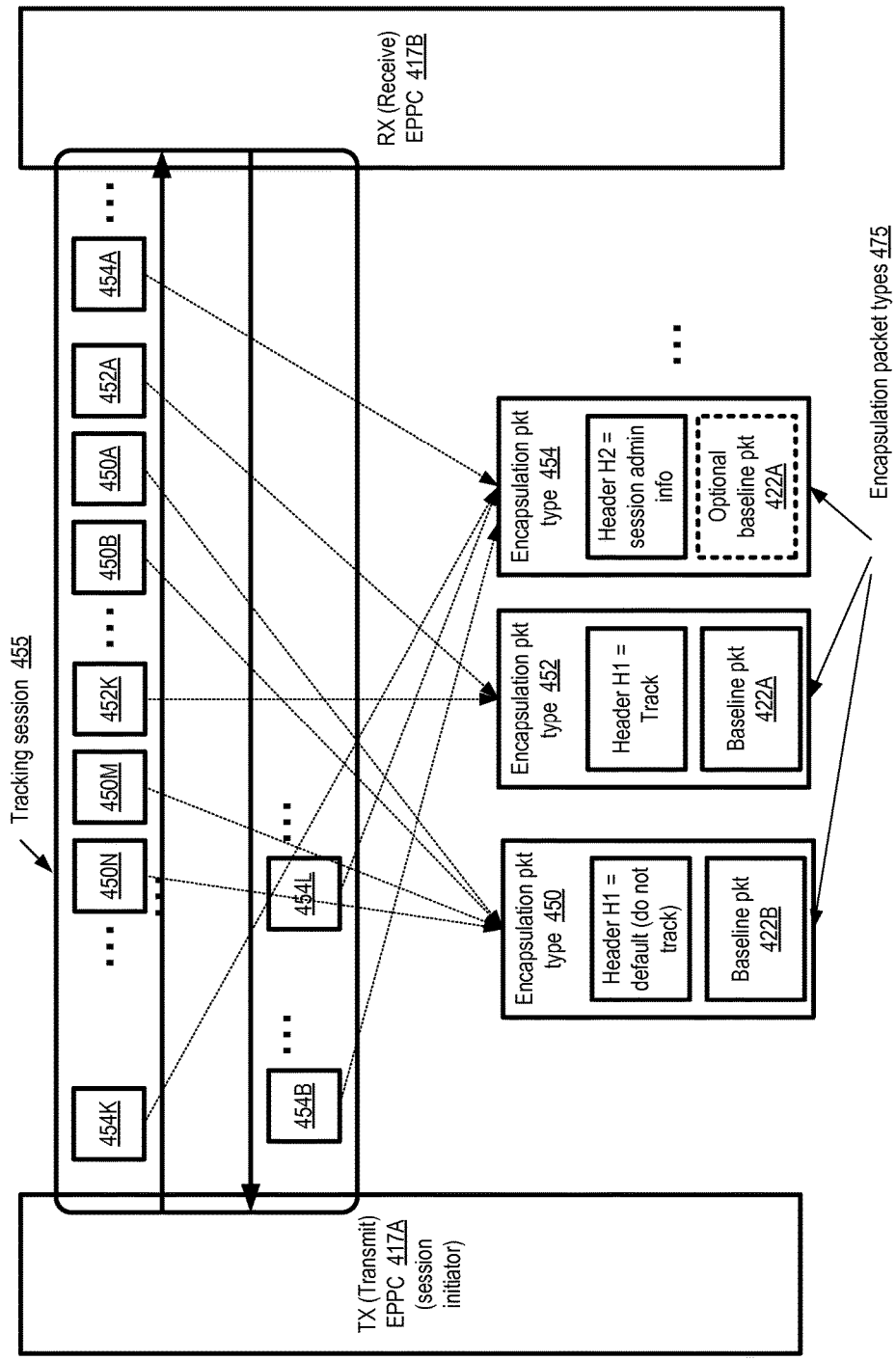
FIG. 4 provides examples of the types of encapsulation packets which may be transmitted between devices of a virtual computing service, according to at least some embodiments.

FIG. 4 provides examples of the types of encapsulation packets which may be transmitted between devices of a virtual computing service, according to at least some embodiments. EPPC 417A is the initiator of packet tracking session 455 (and is thus designated as the TX EPPC) shown in FIG. 4, and EPPC 417B is the receiver or RX EPPC. Three types 475 of encapsulation packets are transmitted during session 455 in the depicted embodiment: session administration packet type 454 which may or may not contain baseline packets 422, tracked packets 452 containing baseline packets (generated at or directed to guest virtual machines of the VCS), and un-tracked packets 450 which also contain baseline packets. A particular encapsulation protocol header H1 (or a designated bit sequence within a header H1) is used to designate whether the encapsulation packet is to be tracked (i.e., whether the TX and RX EPPCs are to count that packet in their statistics regarding total packets etc.). One value or setting for H1 indicates that the packet should be tracked (packet type 452), and another, which may be the default value of H1, indicates that the packet should not be tracked. Other header(s) H2 are used for session administration in the depicted embodiment. It is noted that while in much of this description, various aspects of the packet tracking protocol are described as being implemented using headers of the VCS's encapsulation protocol, in at least some embodiments bit sequences that form subsets of individual headers, or subsets of combinations of different headers, or part of the body of the encapsulation packets rather than headers, may be used. Generally speaking, any selected sequence of bits within an encapsulation packet, such that the selected bit sequence is recognized by the communicating TX and RX EPPCs and/or the NHMS as containing information with a particular set of semantics related to packet tracking, may be used for managing tracking sessions, reporting tracking results, etc.

TX EPPC 417A initiates session establishment by sending an administration packet 454A to proposed RX EPPC 417B in the depicted embodiment. The session 455 is established when TX EPPC 417A receives a corresponding administration packet 454B from RX EPPC 417B, indicating that EPPC 417B has the required resources and is willing to participate in the session. During the session, TX EPPC labels one in three encapsulation packets as tracked packets, leaving the other two untracked. Thus, among three packets sent immediately after administration packet 454A, one (452A) is tracked and two (450A and 450B) are untracked. Similarly, later in session 455, packet 452K is tracked, and the next two packets 450M and 450N are not tracked. In some embodiment, packets may be selected for tracking at random, instead of choosing every Nth non-administration packet for tracking as shown in FIG. 4. At some point during the session, the TX EPPC 417A may send another administration packet 454K, e.g., to request collected tracking metrics from RX EPPC 417B. In response, another administration packet 454L may be sent by the RX EPPC 417B.

Packet Tracking Session Timeline

Figure 5:
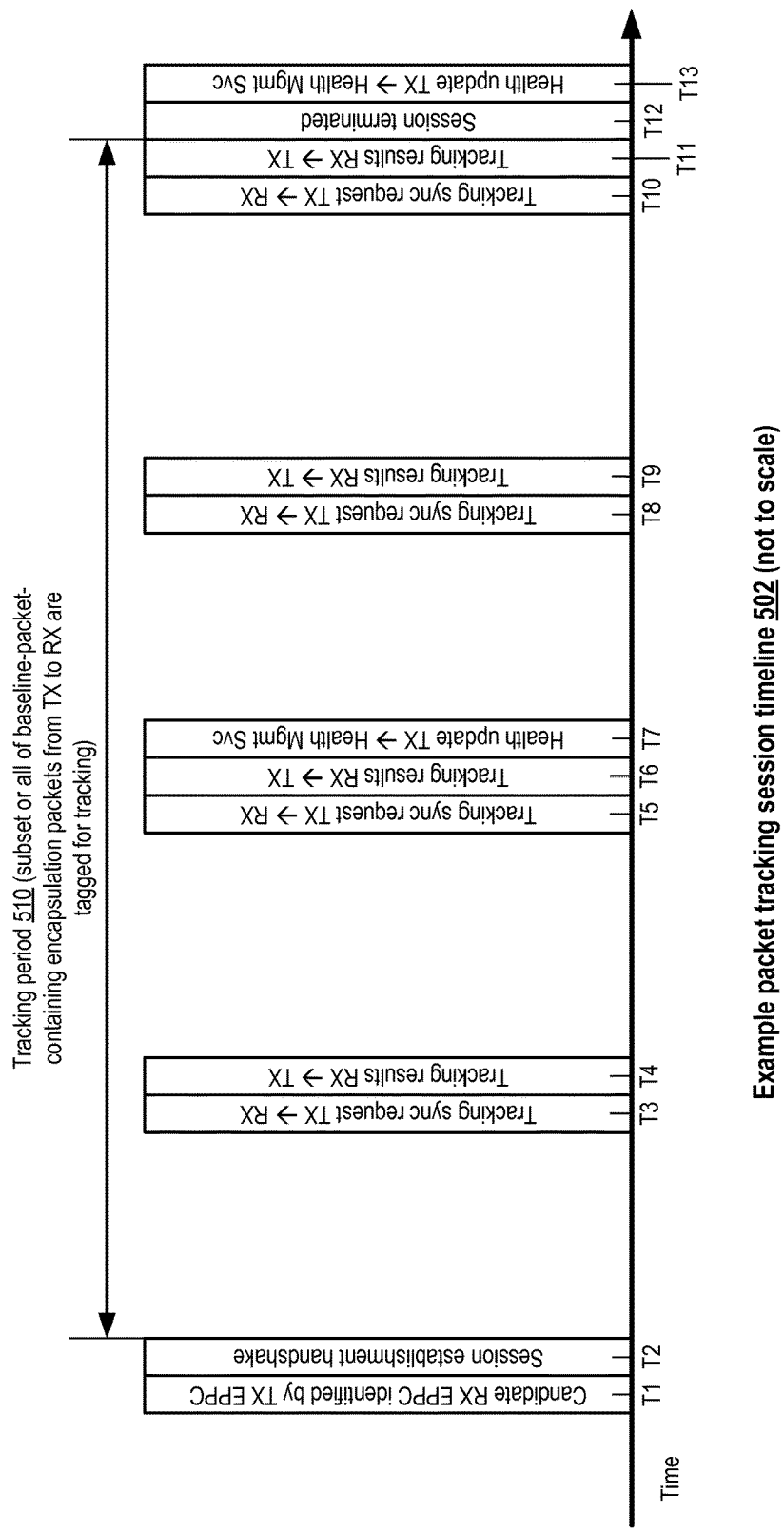
FIG. 5 provides an example timeline of events corresponding to a packet tracking session, according to at least some embodiments.

FIG. 5 provides an example timeline of events corresponding to a packet tracking session, according to at least some embodiments. The events shown at various points in time along timeline 502 do not necessarily represent all the interactions between the TX EPPC, the RX EPPC, and the network health management service which may occur with respect to any given packet tracking session. Instead, FIG. 5 is meant to illustrate the kinds of interactions associated with packet tracking sessions in general. Furthermore, although events are represented by bars in FIG. 5, the widths of the bars are not intended to indicate the relative amounts of time required to perform the corresponding operations.

At time T1 along timeline 502, the TX EPPC of the session identifies the particular peer EPPC with which session establishment is to be attempted. At or around time T2, a session establishment handshake procedure involving an exchange of messages between the TX and proposed RX EPPCs completes, and packet tracking begins. During tracking period 510, at least a subset of the encapsulation packets generated at the TX EPPC which contain baseline packets are tagged for tracking, and statistics for the tracked subset of the packets are maintained at the RX EPPC and at the TX EPPC. At time T3, the TX EPPC sends a tracking synchronization message to the RX EPPC, requesting the metrics that have been collected at the RX EPPC thus far during the session. The RX EPPC sends the requested metrics in a tracking results message at approximately time T4. At time T5, the TX EPPC again sends a tracking synchronization request message, and receives an updated set of metrics at time T6 from the RX EPPC. At time T7, the TX EPPC sends a health update message, whose contents are based at least in part on the metrics collected thus far for the session, to the network health management service. Additional pairs of tracking request/response messages are exchanged between the TX and RX EPPCs at times T8 and T9, and at times T10 and T11 in the example timeline 502.

At time T12, the session is terminated, e.g., at the request of the TX EPPC. In some embodiments, tunable parameters may govern the default duration of packet tracking sessions. The parameters may indicate, for example, the time in seconds for which a tracking session is to be sustained before the resources designated for the session are to be freed and re-used for other sessions, the maximum number of baseline-packet-containing encapsulation packets which can be transmitted during a session, or other session termination criteria. At time T13 on timeline 502, a final network health update message for the session may be transmitted to the network health management service in the depicted embodiment. In various embodiments, in addition to or instead of the duration of packet tracking sessions, the intervals between successive tracking synchronization requests and/or network health update messages may be controlled via tuning parameters.

Encapsulation Protocol Packet Structure Overview

Figure 6:
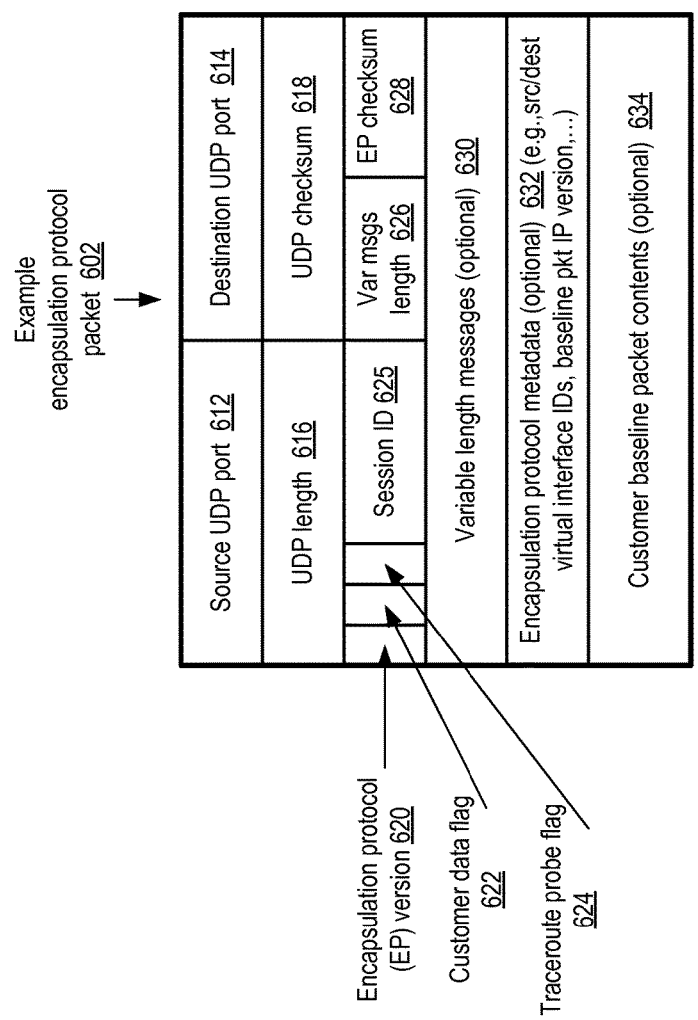
FIG. 6 illustrates example elements of an encapsulation protocol frame, according to at least some embodiments.

FIG. 6 illustrates example elements of an encapsulation protocol packet, according to at least some embodiments. In the depicted embodiment, the encapsulation protocol of the VCS relies on UDP (the User Datagram Protocol) as the underlying transport layer protocol of the Internet protocol suite. The IP header elements used for the encapsulation packet, which may include the source and destination IP addresses corresponding to the sending and receiving EPPCs, are not shown in FIG. 6. In other embodiments, transport layer protocols other than UDP may be used, in which case one or more of the elements of the encapsulation packets may differ from those shown in FIG. 6. The encapsulation packet 602 may include four elements of the UDP header as defined in RFC 768 of the IETF: the source UDP port 612, the destination UDP port 614, the UDP packet length 616, and a UDP checksum 618. Each of these four elements may be two bytes in length as specified in the RFC. The UDP packet length 616 may indicate the total number of bytes used for the encapsulation packet 602 (including the eight bytes used for the UDP header itself). The UDP checksum field may not be used in at least some embodiments—e.g., a dummy value of zero may be stored in the UDP checksum field 618. In some implementations, the same destination UDP port 614 may be used for all the encapsulation packets—e.g., as an indicator that the packet is to be interpreted based on the rules of the encapsulation protocol of the VCS. The source UDP port may be varied in some embodiments for different packets of a given packet tracking session (or for different untracked packets) as a way of utilizing different internal pathways between the same EPPC pair, as described below in further detail.

The lengths of the elements or bit sequences which are not part of the UDP header itself (i.e., elements other than 612, 614, 616 and 618) may vary in different implementations. A version identifier of the encapsulation protocol may be included as element 620 in the depicted embodiment. If the packet 602 includes a baseline packet, the customer data flag 622 may be set. In some embodiments, a traceroute probe flag 624 may be set in a packet when the sender is using the packet to identify the route used for the packet at the level of individual network hops. If an EPPC receives a packet with this flag set, it may respond with an ICMP (Internet Control Message Protocol) "Time Exceeded" message if the received TTL (Time-to-live) is 1. If the received TTL is greater than 1, the receiving EPPC may respond with an ICMP "Host Unreachable".

The session ID element 625 may be used as a tracking tag. In response to a session establishment request (such as a TX capabilities request of the kind described below), in some embodiments, a proposed RX EPPC may include a session ID in its response, and that session ID value may be set in subsequent tracked packets of the session. In some implementations, the session establishment request may itself include a proposed session ID generated by the TX EPPC. If the session ID element is zero, this may indicate that the encapsulation packet is not a tracked packet in some embodiments. Thus, the existence of a non-zero session ID value may represent a "track" tag, and a zero session ID value may represent a "do-not-track" tag in such embodiments.

As discussed in greater detail below in the context of FIG. 7, a number of different types of variable-length messages may be included within encapsulation packets for session administration in various embodiments. The variable messages length element 626 may indicate the length (e.g., in bytes) of the variable-length messages 630, if any such messages are present. The encapsulation protocol (EP) checksum element 628 may include a cyclic redundancy check (CRC) value or some other error detection code for some or all elements of the packet 602. For those encapsulation packets 602 which contain baseline packets 634, a number of additional elements of encapsulation-related metadata 632 may be included. These additional elements may include, for example, information about the virtual interface identifiers of the source and destination GVMs, the IP version being used, a sequence identifier which may be used to detect out-of-order delivery of encapsulation packets, and so on. It is noted that not all the elements indicated in packet 602 of FIG. 6 may be required in some embodiments, and that additional elements not shown in FIG. 6 may be included in at least some types of encapsulation packets in other embodiments.

Tracking-Related Message Types

Figure 7:
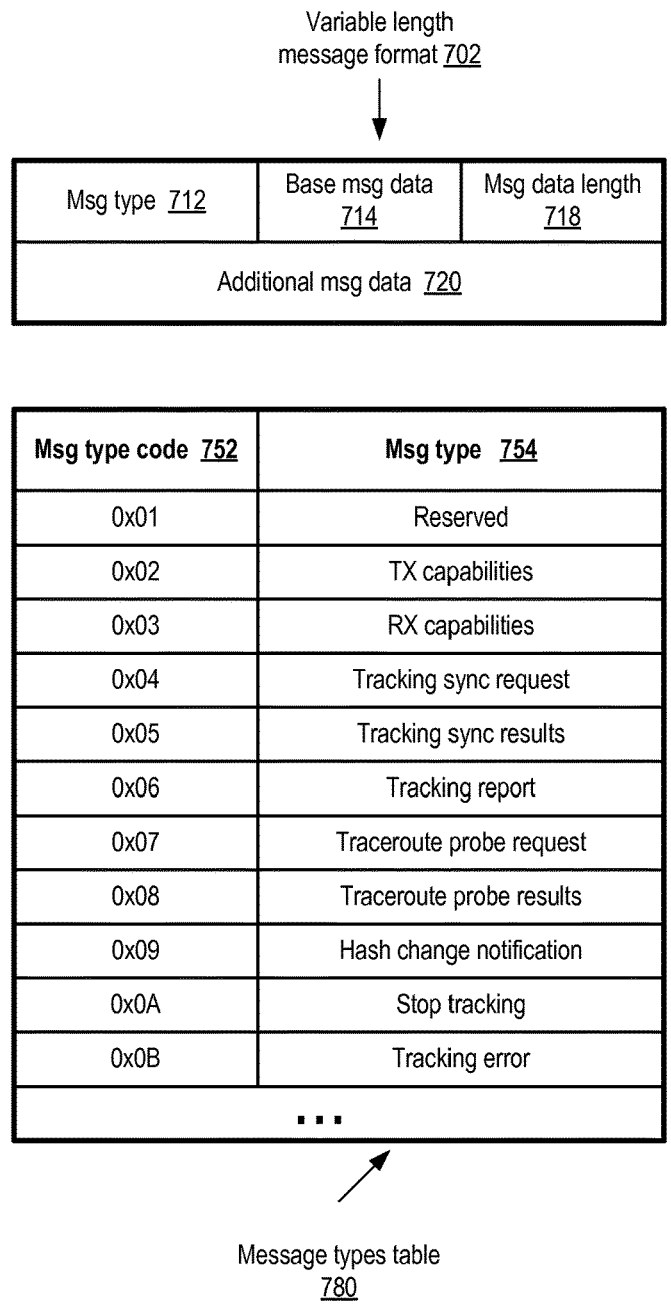
FIG. 7 illustrates example types of tracking-related messages which may be included in encapsulation packets, according to at least some embodiments.

FIG. 7 illustrates example types of tracking-related messages which may be included in encapsulation packets, according to at least some embodiments. In embodiments in which encapsulation packets are structured in a manner similar to that shown in FIG. 6, one or more such messages may be included in the variable-length messages element 630. As shown in FIG. 7, the format 702 for a tracking-related message may include a message type element 712, a base message data element 714 of a fixed length, a message data length element 718, and additional message data element 720. The base message data element may be relatively short (e.g., one or two bytes) in some embodiments. If the entire contents of the tracking-related message can fit in the base message data element 714, the message data length element 718 may be set to indicate that no additional message data is included. If the contents of the tracking-related message cannot fit in the base message data element, in some embodiments the remainder of the message may be included in the additional message data element 720, with the total number of bytes of the additional message data being indicated in message data length element 718. In one embodiment, if the message content is too long for the base message data element, the entire message may be included in the additional message data element 720, and the base message data element may not be used.

In the embodiment depicted in FIG. 7, respective codes 752 used for the different message types 754 are shown in hexadecimal format (with the prefix "0x" indicating that the hexadecimal format is being used) in table 780. Other encoding schemes for message types may be used in different embodiments. The code for a given message may be included in the message type element 712. According to the coding scheme illustrated in FIG. 7, code 0x01 is reserved (i.e., not used for tracking-related messages). Code 0x02 indicates a TX capabilities message, which may be transmitted by an EPPC to initiate a session establishment. Code 0x03 may be used in an RX capabilities message which is prepared in response to a TX capabilities message.

A tracking synchronization request message (code 0x04) may be sent from a TX EPPC to the RX EPPC to obtain one or more metrics being collected at the RX EPPC (such as the total number of tracked packets received, the number of dropped packets, the number of out-of-order packets, etc.). The requested metrics may be provided to the TX EPPC by the RX EPPC using a tracking synchronization results message (code 0x05) in the depicted embodiment. The TX EPPC may sent a network health update message (whose contents are based at least in part on the metrics received from the RX EPPC) to a node of the network health management service (NHMS) using a tracking report message (code 0x06).

As mentioned earlier, in at least some embodiments the hops (e.g., internal router-to-router hops, host-to-router hops and/or router-to-host hops) traversed by encapsulation packets transmitted between EPPCs may be determined using the equivalent of a traceroute command. A traceroute probe request message with code 0x07 may be used to request the tracing of a route (e.g., by an NHMS component), and the results of the corresponding route trace may be included in a traceroute probe results message with code 0x08.

In some embodiments as described below, multiple network paths may be available between a given pair of EPPCs, and the particular path selected for a set of encapsulation packets may be varied by the TX EPPC. A hash function (whose input variables may include, for example, the source and destination ports and IP addresses of the encapsulation packet and an identifier of the IP protocol in use for the packet) may be used at internal routers of the VCS to select the next hop among the available hops for the packet, as discussed below in further detail. A TX EPPC may modify one or more of the inputs to the hash function, e.g., by modifying the source UDP port value, to change the path being used. A hash change notification message with code 0x09 may be sent to the RX EPPC by a TX EPPC to indicate that one or more encapsulation packets sent after the hash change notification message will use a different path than the path which was used for encapsulation packets before the hash change notification. The hash change notification message may be used to determine relative latencies of different paths in some embodiments as discussed below.

A stop tracking message (code 0x0A) may be sent by a TX EPPC to and RX EPPC to end a packet tracking session. A tracking error message (code 0x0B) may be sent by an RX EPPC to a TX EPPC if the RX EPPC receives a message (such as a tracking synchronization request message) with an unexpected session ID. Similarly, tracking error messages may also be sent by TX EPPCs to RX EPPCs if the TX EPPCs receive unexpected messages from the RX EPPCs in at least some embodiments. A number of other message types which are not shown in FIG. 7 may be supported in some embodiments, and some of the message types illustrated in FIG. 7 may not be supported in at least some embodiments.

Session Establishment Handshake

Figure 8:
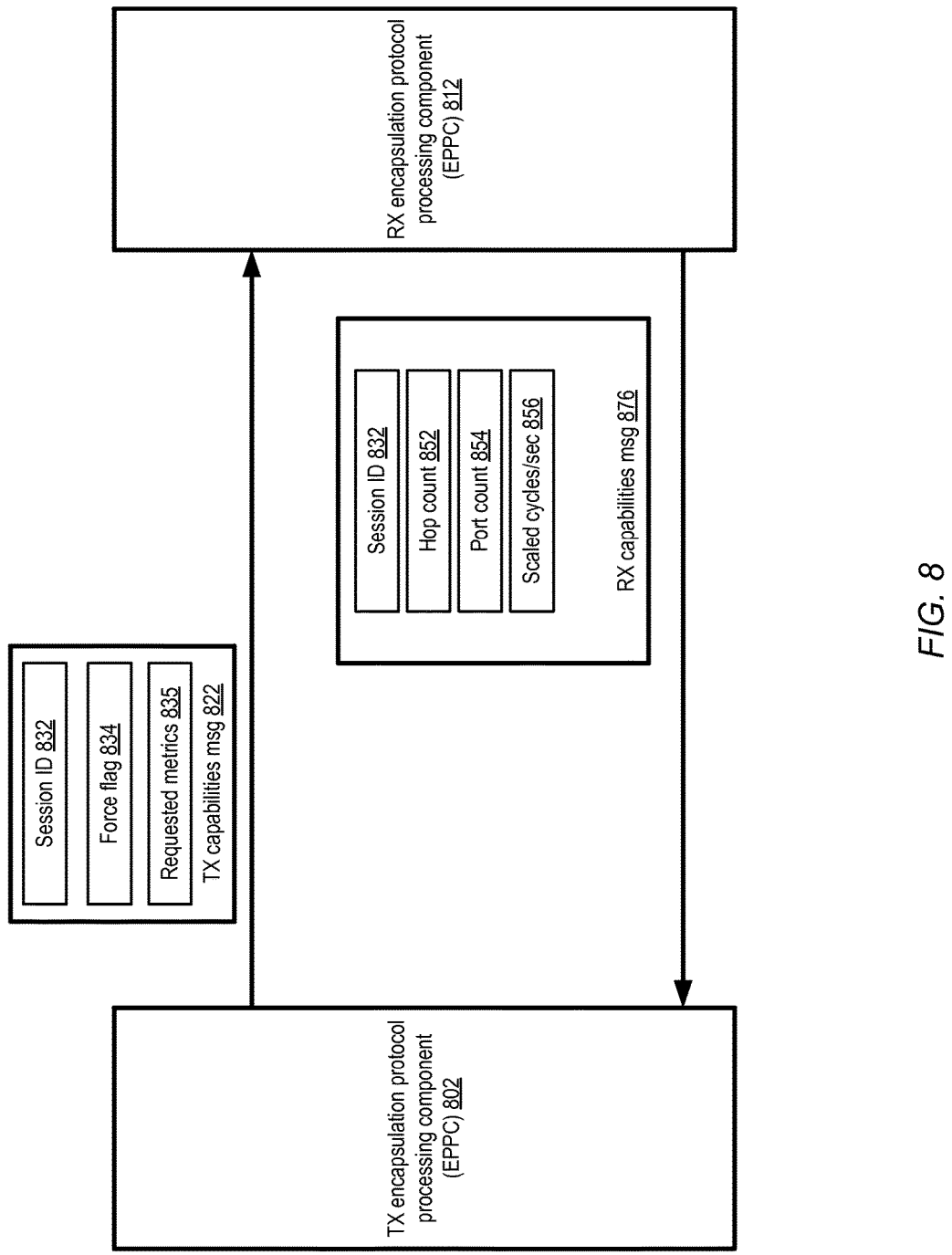
FIG. 8 illustrates an example tracking session establishment handshake procedure, according to at least some embodiments.

FIG. 8 illustrates an example tracking session establishment handshake procedure, according to at least some embodiments. An EPPC may decide that it should initiate a packet tracking session in the role of a TX EPPC based on various factors in different embodiments: e.g., if it determines that sufficient tracking resources are available, and sufficient traffic is flowing between it and another EPPC for useful network metrics to be collected. In many cases, the TX EPPC may be transmitting packets to a large number of peer EPPCs, and a particular one of those peers may be selected as a potential RX EPPC for a session. The criteria used for selecting a peer EPPC as a potential RX EPPC may also vary in different embodiments, and may in some cases be based on tunable parameters such as a minimum level of inter-EPPC traffic (in bytes/second or in packets/second), a minimum duration for which a network connection has been maintained between the TX EPPC and the proposed RX EPPC, a minimum delay between successive tracking sessions involving the same pair of EPPCs, etc.

To request establishment of a packet tracking session, the TX EPPC 802 may send a TX capabilities message 822 to the proposed RX EPPC 812 in the depicted embodiment. Among other elements, the TX capabilities message may include a session ID element 832, a force flag 834 and/or a requested metrics specification 835. In at least some embodiments, the session ID may be set to zero (or some other protocol-defined value) by the TX EPPC to indicate that a new session is being requested, and the RX EPPC may include a different value selected for the session ID in its response to the TX capabilities message. In other embodiments, the TX EPPC may select the session ID value for a new proposed session and include it in the TX capabilities message. The force flag 834 may be used to indicate the priority or importance of the proposed session relative to other sessions in which the proposed RX EPPC is currently a participant. If the force flag is set by the TX EPPC to indicate a high priority (e.g., if the new session is being established in response to a follow-up request from the network health management service to diagnose a potential network impairment), the RX EPPC may in some cases end an in-progress packet tracking session. The session may be terminated so that the tracking resources previously set aside for the terminated session can now be deployed for the newly-proposed session. The manner in which the victim packet tracking session (the one whose tracking resources are to be assigned to the newly-proposed tracking session) is identified may differ in various implementations, e.g., based on tunable parameter settings. In some embodiments, the session which has been in progress the shortest amount of time among the active sessions of the RX EPPC may be selected as the victim, for example, while in other embodiments the session which has been in progress the longest may be selected as the victim. In one embodiment, a requested metrics specification 835 may indicate the types of metrics (e.g., total packets received, corrupted packet received, out-of-order packet received, etc.) that the RX EPPC is expected to collect if it accepts the request to establish the session.

In response to receiving the TX capabilities message, the proposed RX EPPC 812 may check whether sufficient tracking resources are available for the new session, and whether it (the RX EPPC) can collect the requested metrics. As discussed above, the force flag 834 may influence the selection of tracking resources—e.g., whether the RX EPPC should free up in-use tracking resources or not. If the force flag does not indicate a high priority, for example, and the RX EPPC does not have sufficient tracking resources for a new session, an RX capabilities message 876 may include an indication (e.g., in the session ID field 832) that the requested session cannot be established. In contrast, if enough free tracking resources are found and the RX EPPC can provide the requested metrics, the RX capabilities message may indicate that the RX EPPC is willing to implement a packet tracking session. The session ID value included in the RX capabilities message may be used to tag encapsulation packets which are to be tracked during the session. In at least some embodiments, an indication of the hop count 852 for the path taken by the TX capabilities message (which may be determined by the RX EPPC based on a time-to-live (TTL) element in a header associated with the TX capabilities message) may also be included in the RX capabilities message.

In embodiments in which a hash-based selection of next hops is used for encapsulation packet routing (e.g., in accordance with an equal-cost multi-path or ECMP strategy), the number of distinct ports or paths which can be tracked for the proposed session at the RX EPPC may be indicated in port count element 854 of the TX capabilities message. If the port count element indicates that traffic corresponding to four distinct ports can be tracked by the EPPC, for example, the TX EPPC may set the UDP source port to different ones of four values during the session to modify the routes taken by encapsulation packets of the session. The scaled cycles/second element 856 may be used to indicate the units in which packet transfer latencies may be collected at the RX EPPC in some embodiments. For example, in one embodiment, if the RX EPPC runs at a virtualization host whose CPU's clock frequency is G gigahertz, (G/256) or (G/1024) may be indicated as the scaled cycles/second value. In some embodiments an explicit acknowledgment that the RX EPPC can collect metrics of the requested types may be included in the RX capabilities message. A number of other elements may be included in the TX capabilities messages and RX capabilities messages in different embodiments, such as elements detailing other characteristics of the computing devices (e.g., software versions, memory sizes, current number of established network connections, recent CPU utilization levels, network bandwidths, etc.) at which the TX EPPC and the RX EPPCs are instantiated. In some embodiments, one or more of the elements shown in FIG. 8 may not be included in the capabilities messages used during the session establishment handshake procedure (for example, a fixed set of metrics may be expected to be collected at each RX EPPC, in which case the requested metrics element 835 may not be required). In at least one embodiment, the TX EPPC 802 may examine some of the information contained in the RX capabilities message 812 and determine that the proposed session should not be established—e.g., the TX EPPC may decide to abandon the session it proposed based on a determination that the RX EPPC does not have adequate performance or functional capabilities. In one implementation, in such a scenario, the TX EPPC 802 may send a "stop tracking" message to the RX EPPC 812 to terminate the session.

RX EPPC Responses to Encapsulation Packets

Figure 9A:
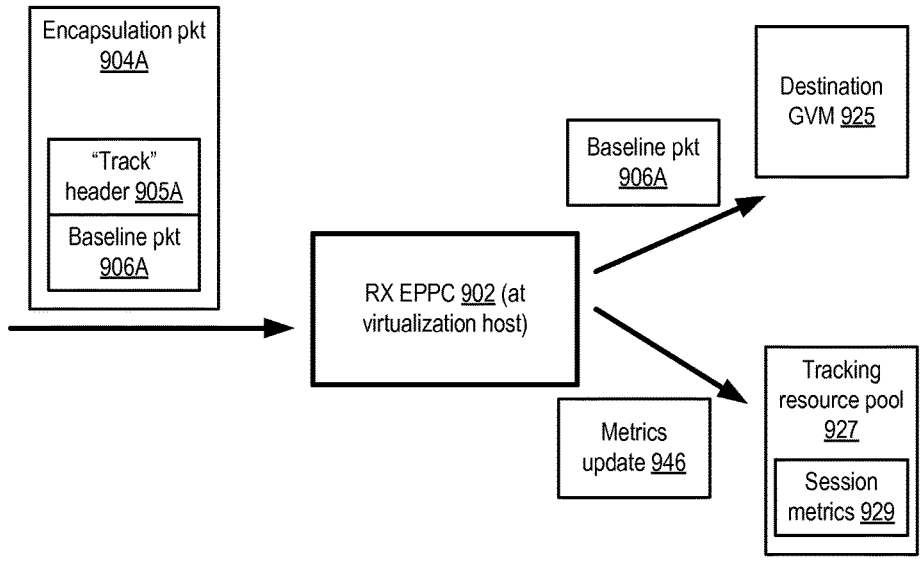
FIGS. 9a and 9b respectively illustrate example responses of a receiver encapsulation protocol processing component (RX EPPC) to tracked and untracked encapsulation messages, according to at least some embodiments.
Figure 9B:
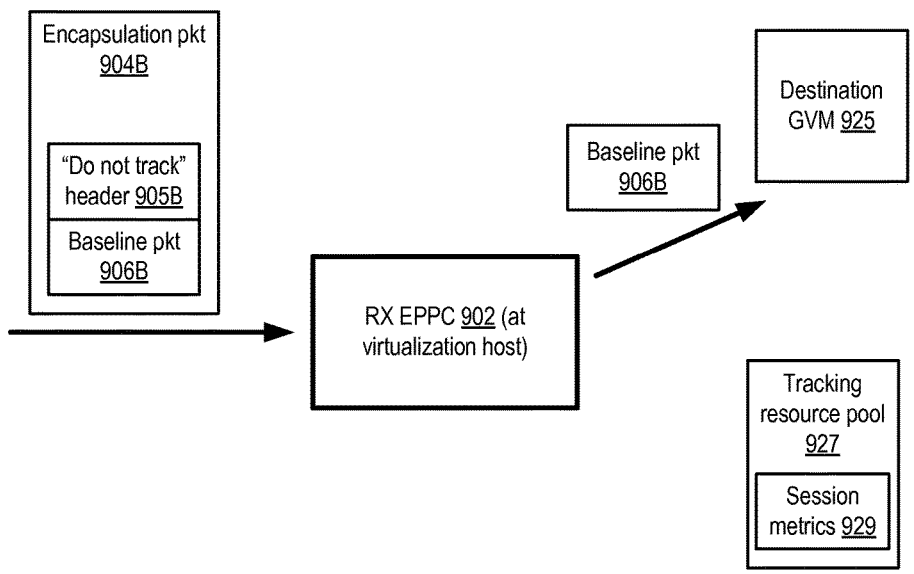

FIGS. 9a and 9b respectively illustrate example responses of a receiver encapsulation protocol processing component (RX EPPC) to tracked and untracked encapsulation messages, according to at least some embodiments. As discussed earlier, e.g., in the context of FIG. 4, not all the packets sent by a TX EPPC to an RX EPPC after a session has been established (and before the session is terminated) may necessarily be tracked. In at least some embodiments, respective encapsulation header values or bit sequences may be used to indicate (a) whether a given encapsulation packet is being tracked and (b) the session identifier of the tracking session in progress. In other embodiments, the session identifier may itself serve as a "track" or "do not track" indicator.

In FIG. 9a, an RX EPPC 902 of a virtualization host receives an encapsulation packet 904A containing a header 905A indicating that the packet is a tracked packet, and a baseline packet 906A. In response, the RX EPPC 902 performs at least two tasks. In one task, the baseline packet 906A is extracted and passed on to its destination GVM 925. In the second task, the RX EPPC identifies, within its tracking resource pool 927, the particular data structures 929 set aside for the session to which the packet 904A belongs, and applies one or more metrics updates 946. For example, the total number of tracked packets received during the session may be incremented, and if the packet 904A was received out-of-order with respect to other packets of the session, the number of out-of-order packets received during the session may be incremented.

In the scenario depicted in FIG. 9b, the same RX EPPC receives a different encapsulation packet 904B, containing a header 905B indicating that the packet is not tracked. When such a packet is received, the RX EPPC performs just the first of the tasks indicated in FIG. 9a—the baseline packet 906B is extracted from the encapsulation packet and passed on to the destination GVM 925.

If the RX EPPC were located at an edge router of the virtual computing service rather than at a virtualization host (as is the case in FIG. 9a and FIG. 9b), the first task performed by the EPPC may comprise, for example, forwarding the extracted baseline packet towards a destination outside the VCS in accordance with a different encapsulation/tunneling protocol (instead of passing on the baseline packet to a destination GVM as indicated in FIG. 9a and FIG. 9b). In response to receiving a tracked encapsulation packet, the tracking session metrics may be updated in a similar manner regardless of whether the RX EPPC is located at an edge router or at a virtualization host in various embodiments.

Tracking Metrics Synchronization

Figure 10:
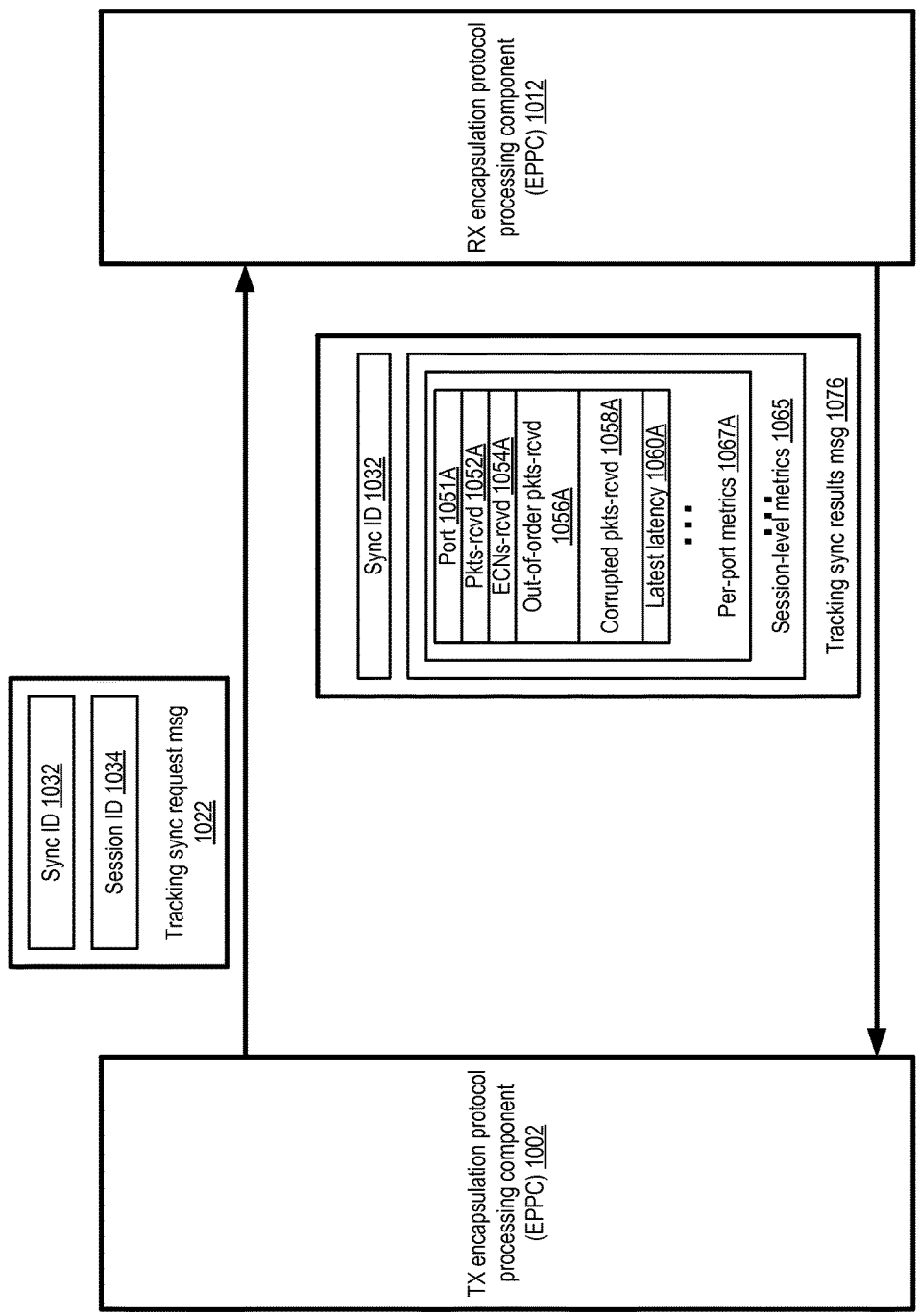
FIG. 10 illustrates example interactions associated with obtaining metrics at a transmitter encapsulation protocol processing component (TX EPPC) from a receiver encapsulation protocol processing component (RX EPPC), according to at least some embodiments.

FIG. 10 illustrates example interactions associated with obtaining metrics at a transmitter encapsulation protocol processing component (TX EPPC) from a receiver encapsulation protocol processing component (RX EPPC), according to at least some embodiments. The TX EPPC 1002 may transmit a tracking synchronization request message 1022 which includes a session ID 1034 (indicating the session for which metrics collected at the RX EPPC are being requested), and a synchronization identifier 1032 which is used to match tracking synchronization requests with their respective responses. As discussed earlier, e.g., in the context of FIG. 5, such tracking synchronization request messages may be sent one or more times during a packet tracking session. The TX EPPC may determine when to send a tracking synchronization message 1022 based on various criteria in different embodiments—e.g., at regular time intervals such as once every T seconds, after a particular number of packets or number of bytes have been sent to the RX EPPC since the previous tracking synchronization message was sent, in response to a request received from the network health management service to report tracking results, etc.

In response to receiving the tracking synchronization request message 1022, the RX EPPC 1012 may first verify that the session ID 1034 in the message corresponds to a session for which the RX EPPC has been collecting metrics. If the session ID does not match a tracked session, a tracking error message (e.g., with a message type code 0x0B shown in FIG. 7) may be sent to the TX EPPC. If the session ID is validated, the RX EPPC may prepare a tracking synchronization results message 1076 and transmit it to the TX EPPC 1002 in the depicted embodiment. The results message 1076 may include the synchronization identifier 1032 (corresponding to the request message 1022's synchronization identifier) and session-level network metrics 1065 in the depicted embodiment. In embodiments in which the RX EPPC has collected respective sets of network metrics for different UDP source ports (and corresponding alternate pathways between the TX EPPC and the RX EPPC), an array of metric sets with one array element for each of the different UDP source ports used during the session may be included in the results message 1076. Any combination of a number of different types of network metrics may be collected for each port (and/or for the session as a whole) in different embodiments. For example, per-port metrics 1067A for a given port 1051A may include the total number of packets received 1052A, the number of ECNs (explicit congestion notifications) received 1054A, the number of out-of-order packets received 1056A, the number of corrupted packets received 1058A, and one or more latency measures such as the latest latency recorded for transmitting encapsulation packets using that port. In some embodiments, estimates of the packet transmission latency may be obtained by the RX EPPC as follows: when a hash change notification message is received, indicating that the next encapsulation packet sent by the TX EPPC will use a different port (and hence a different path), the RX EPPC may start a timer. When the next encapsulation packet is received, the timer may be stopped, and the elapsed time indicated by the timer may be considered a measure of the latency for the new path (e.g., under the assumption that the TX EPPC sent the encapsulation packet immediately after sending the hash change notification message). The elapsed time may be converted into the units being used for expressing latency (such as the scaled cycles/second unit discussed above) before it is transmitted as part of a tracking synchronization results message in some embodiments. Additional metrics, such as one or more route traces available at the RX EPPC, which identify the intermediary routers and links used for the alternate paths between the RX EPPC and the RX EPPC may also be included in the tracking synchronization results messages in some embodiments. Some of the network metrics shown in FIG. 10 may not be collected or provided to the TX EPPC in some embodiments. In embodiments in which per-port metrics are not collected, a single set of metrics may be provided to the TX EPPC for the session as a whole instead of an array which includes one entry per port.

Encapsulation Packet Route Variation

Figure 11:
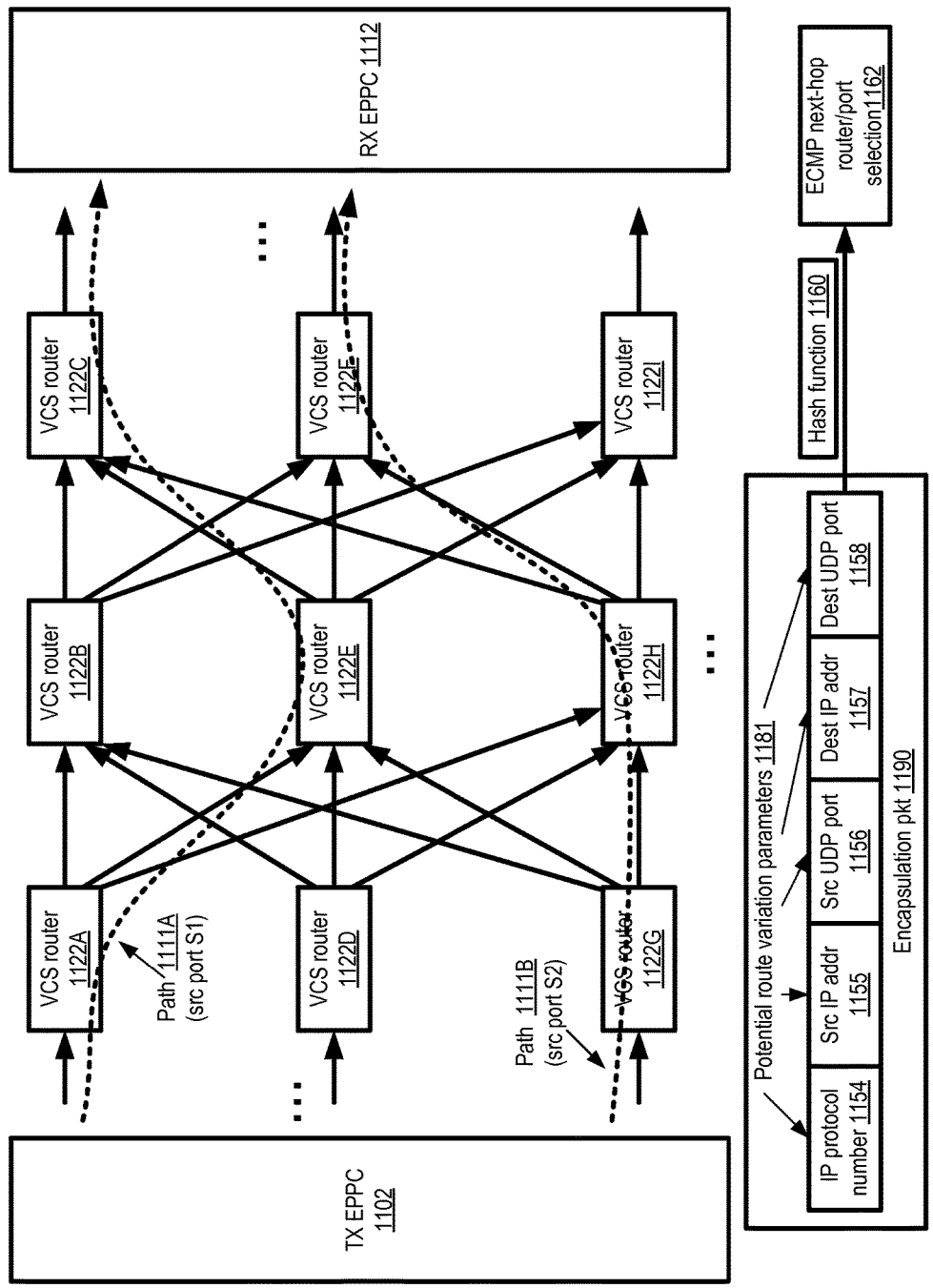
FIG. 11 illustrates example route variation parameters for encapsulation packets transmitted between encapsulation protocol processing components of a virtual computing service, according to at least some embodiments.

FIG. 11 illustrates example route variation parameters for encapsulation packets transmitted between encapsulation protocol processing components of a virtual computing service, according to at least some embodiments. In many virtualized computing services environments, a dense internal network whose switches, routers and other network devices have numerous input ports and output ports may be set up, and as a result numerous alternatives with roughly equivalent performance may exist for the paths which encapsulation packets may take between any given pair of EPPCs. In the depicted embodiment, nine intermediary VCS routers 1122 (routers 1122A-1122I) are shown as part of the internal network between a TX EPPC 1102 and RX EPPC 1112. Each of the next hops possible for a packet received at a router 1122 is assumed to be of equal cost in the example shown in FIG. 11. For example, with respect to performance, no difference may be expected on average whether a packet is transmitted from TX EPPC 1102 to RX EPPC 1112 via the combination of routers (1122A, 1122B, 1122C) or the combination of routers (1122A, 1122E, 1122I). At some or all of the routers 1122, a determination of the next equal-cost hop to be taken by an encapsulation packet 1190 transmitted from TX EPPC 1102 towards RX EPPC 1112 may be based at least in part on a hash function applied to a 5-tuple of properties of the packet: the IP protocol number 1154, the source and destination IP addresses 1155 and 1157, and the source and destination UDP ports 1156 and 1158. The output of the hash function 1160 may be to select one link or hop among the several hops available, and/or one of the ports at the next router along the selected path. The elements of the 5-tuple may collectively be referred to as potential route variation parameters 1181.

Among the five potential route variation parameters 1181 which can influence the path taken by a given packet, one or more may be fixed for the packets of a tracking session, while it may be possible for the TX EPPC to vary others. For example, in one embodiment, all the route variation parameters except the source UDP port 1156 may be fixed. The source and destination IP addresses may not be modified by the TX EPPC because they identify the hosts and/or edge routers involved in the communication, for example, while the IP protocol number (e.g., 17 for UDP) and the UDP destination port may have to be set to particular values defined for the encapsulation protocol. The TX EPPC may set the UDP source port to S1 for one encapsulation packet sent to the RX EPPC, resulting in the selection of the links of path 1111A for that packet. For another encapsulation packet, if the UDP port is set to S2 and all other parameters remain unchanged, the path 1111B may be taken in accordance with the hash-based ECMP next-hop router and/or port selection algorithm being used.

Figure 12:
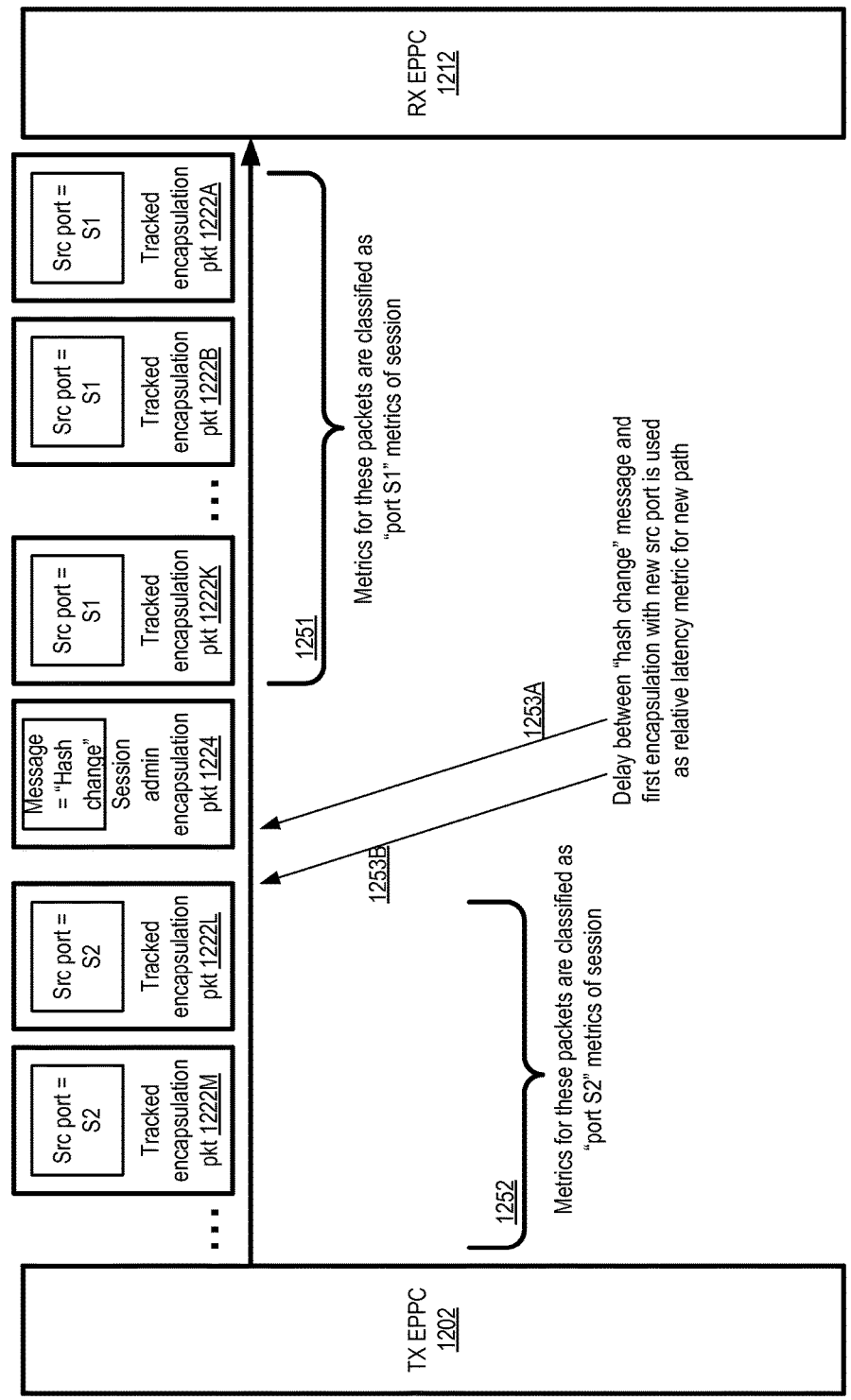
FIG. 12 illustrates an example of a route change for encapsulation packets which may be initiated by a transmitter encapsulation protocol processing component (TX EPPC), according to at least some embodiments.

FIG. 12 illustrates an example of a route change for encapsulation packets which may be initiated by a transmitter encapsulation protocol processing component (TX EPPC), according to at least some embodiments. A sequence of encapsulation packets 1222A-1222M transmitted between TX EPPC 1202 and RX EPPC 1212 is shown. The hash-based next hop selection technique illustrated in FIG. 11 is assumed to be in effect. Among the five route variation parameters shown in FIG. 11, the TX EPPC 1202 is permitted to change the source UDP port value in the depicted embodiment. For tracked encapsulation packets 1222A-1222K, the source port value S1 is used. The TX EPPC 1202 decides to change the source UDP port for tracked encapsulation packets sent after packet 1222K. The decision to change the source port may typically result in a change of at least some portion of the route taken between the TX and RX EPPCs, although the specific set of intermediary devices which will be used may not necessarily be determinable by the TX EPPC in the depicted embodiment, since the decisions for selecting hops may be made at the intermediary devices themselves and not at the TX EPPC.

Any combination of a number of factors may influence or trigger the decision to change the source port (and hence in all likelihood the path taken by the packets with the changed port) in different embodiments. For example, in one embodiment the source port may be changed at randomly-selected points in time during a packet tracking session (or even if no packet tracking session is currently in progress), with the overall goal of distributing the traffic among available paths and thereby avoiding hotspots. In other embodiments, the TX EPPC may decide to change the source port based on at least a preliminary analysis of collected metrics—e.g., if it appears that a path which is currently in use for a tracking session is resulting in too many dropped or corrupted packets, a new path may be tried by changing the source port. As mentioned earlier, in at least some embodiments the RX EPPC 1212 may indicate, in the RX capabilities message it prepares during the setup of the session, the number of distinct ports for which it maintain separate sets of metrics. In one embodiment, the network health management service may instruct the TX EPPC to change the source port, e.g., after analyzing the contents of one or more health update messages pertaining to a packet tracking session.

In the embodiment depicted in FIG. 12, the TX EPPC 1202 sends an administrative encapsulation packet 1224 (e.g., an encapsulation packet which may not include a baseline packet) to indicate that a hash change is being implemented by changing the source UDP port for subsequent encapsulation packets. After the hash change notification is sent, the source port value S2 is used for the subsequent tracked encapsulation packets such as 1222L and 1222M. The RX EPPC 1212 may store separate sets of metrics 1251 and 1252 corresponding to the two different source ports S1 and S2, and may include both sets of metrics in tracking synchronization results messages sent to the TX EPPC. In addition, in the depicted embodiment, the time between the receipt of the hash change notification message 1224 and the immediately following encapsulation packet 1222L may be recorded at the RX EPPC 1212 as a metric of the latency associated with the new path resulting from the source port change, as indicated by arrows 1253A and 1253B. Such a latency estimate may also be included in a subsequent tracking synchronization results message sent to the TX EPPC.

Network Health Management Service

Figure 13:
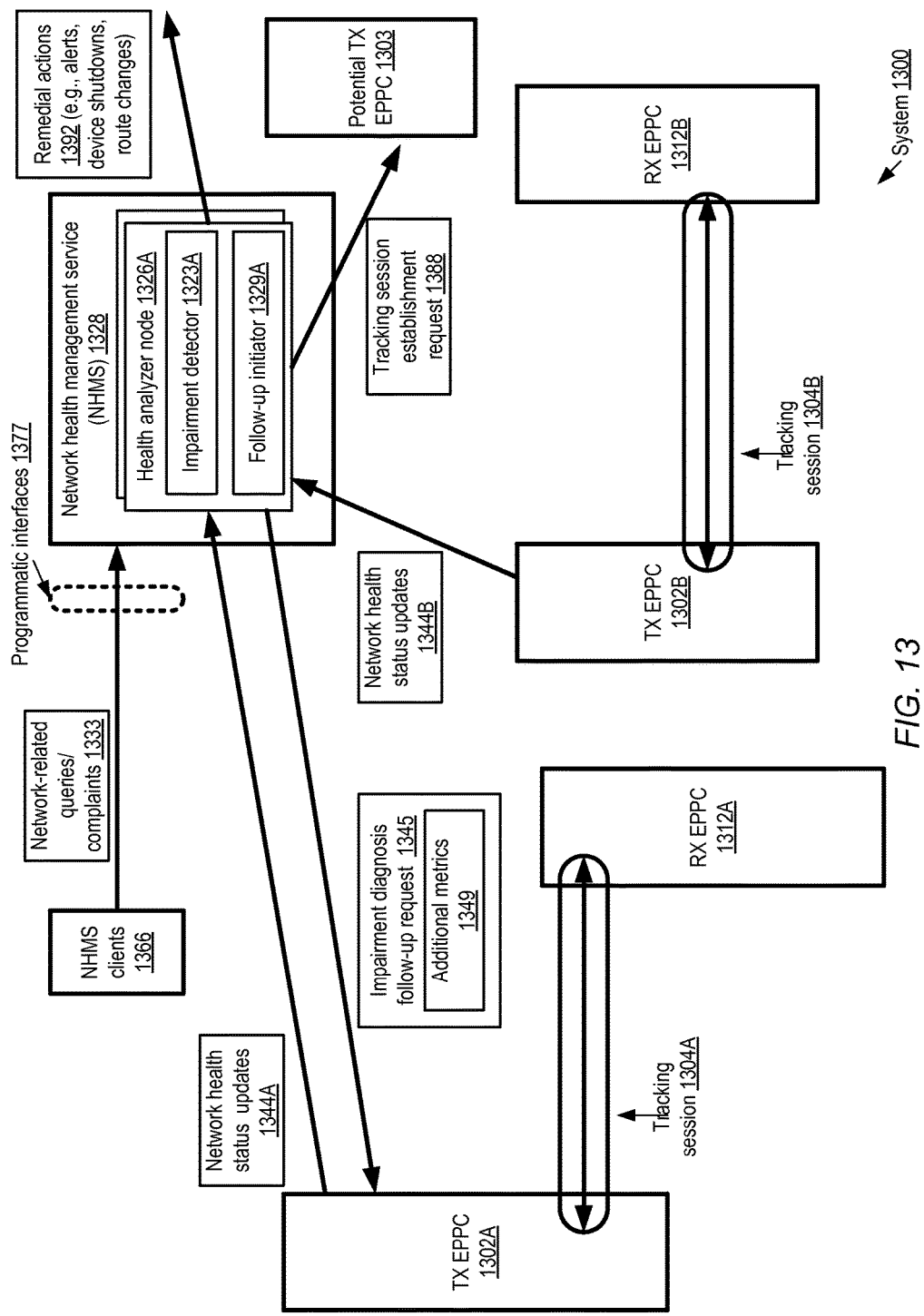
FIG. 13 illustrates an overview of operations which may be performed at a network health management service using data collected at encapsulation protocol processing components, according to at least some embodiments.

In at least some embodiments, the EPPCs may provide the metrics collected in various packet tracking session to a network health management service for more detailed analysis and (if needed) initiation of impairment recovery operations. FIG. 13 illustrates an overview of operations which may be performed at a network health management service using data collected at encapsulation protocol processing components, according to at least some embodiments. In system 1300, network health management service (NHMS) 1328 associated with (or implemented as part of) a virtual computing service comprises a plurality of health analyzer nodes such as node 1326A. The NHMS 1328 may comprise a metrics repository at which network health metrics collected via packet tracking sessions established between various EPPC pairs are aggregated, correlated and analyzed at a deeper level of detail than may be possible at the EPPCs themselves. The collected metrics may be used to identify the details of network impairment events (e.g., failures or poor performance of particular networking devices or links) and to initiate recovery actions appropriate for the failures or defects identified. In various embodiments, decisions regarding additional metrics that should be collected from existing packet tracking sessions to investigate potential failures or impairments, and/or decisions regarding the establishment of new packet tracking sessions, may be made at the NHMS. In some embodiments, the NHMS nodes may implement machine learning or other predictive models to help identify or anticipate network impairments more quickly over time, and to improve the effectiveness of the remedial actions taken in response to the detection of network impairments.

In the embodiment depicted in FIG. 13, packet tracking session 1304A has been established between TX EPPC 1302A and RX EPPC 1312A, and packet tracking session 1304B has been established between TX EPPC 1302B and RX EPPC 1312B. The sessions 1304A and 1304B may have been set up using the handshake procedure described earlier, for example. Corresponding to each of the sessions, respective network health status update messages 1344 (e.g., 1344A and 1344B) are transmitted to NHMS health analyzer nodes 1326. At the NHMS, the collected metrics may be analyzed to determine whether clear evidence of network impairment can be identified, whether additional investigation into potential impairments is justified, or whether no follow-up action is needed with respect to a given set of collected metrics. Some or all of the health analyzer nodes 1326 may comprise subcomponents such as respective impairment detectors 1323A and or follow-up initiators such as 1329A. The impairment detectors 1323 may, for example, aggregate network metrics collected from various EPPCs and/or other sources and determine the probability of an impairment based on the combined metrics. If the probability is above a threshold, one or more immediate remedial actions 1392 such as disabling/replacing network devices found to be underperforming or failed, generating alerts to administrators, initiating routing changes to bypass faulty or non-performant devices and the like may be initiated in the depicted embodiment. If the probability of impairment in a particular part of the VCS network is non-zero and below the threshold that requires immediate remedial action, additional metrics may be collected so that a more informed judgment can be made. In such a scenario, an impairment diagnosis follow-up request 1345 containing a directive to obtain a list of additional metrics 1349 may be transmitted to selected EPPCs such as EPPC 1302A. In the depicted embodiment, the follow-up actions initiator 1329A may be responsible for identifying the specific metrics to be collected and for preparing the follow-up request 1345. In some cases, the additional metrics 1349 requested may comprise more data points representing the same types of metrics that were already being collected; in other cases, one or more metric types which were not being collected previously may be requested. The specific RX EPPCs from which the additional metrics 1349 are to be collected, the time period for which the additional metrics 1349 are to be collected, and/or the frequency at which the metrics are to be reported back to the NHMS 1328 may be indicated in the follow-up requests 1345 in the depicted embodiment. In at least one embodiment, the particular encapsulation header values which are to be set to collect additional metrics may be indicated in the follow-up requests 1345.

In some cases, the NHMS nodes may decide that new sessions should be set up to collect additional metrics—for example, a tracking session establishment request 1388 may be sent to potential TX EPPC 1303 (i.e., an EPPC that is not currently participating in a session as a TX EPPC), indicating the particular RX EPPC with which a new session is to be established, and/or details of the metrics that are to be obtained via the new session. A number of iterations of metric collection and follow-up messages may be needed in some embodiments before a decision can be reached at the NHMS regarding whether a suspected impairment represents an actual failure requiring remedial actions, or whether the suspicion was in effect a false alarm. Based on the information collected as a result of the follow-up messages and/or the new sessions established at the request of the NHMS nodes, remedial actions 1392 may eventually be scheduled in some cases in the depicted embodiment. In at least some embodiments, the follow-up requests may indicate that a high priority is to be associated with the collection of the additional metrics, and the "force" flag (discussed in the context of FIG. 8) or other priority indicators may be used for the sessions in which the additional metrics are obtained. As a result of the higher priority assigned to the investigation of potential impairments, one or more existing sessions may have to be terminated (e.g., to free up tracking resources needed for high-priority sessions as discussed in the context of FIG. 8). In some embodiments the priority of an existing session may be increased dynamically, e.g., by setting a selected header value, which may help ensure that the resources being used for the session are not reclaimed until the priority is lowered, until a session with an even higher priority is required, or until the existing session is terminated.

In various embodiments, clients 1366 of the NHMS and/or the VCS may submit networking-related queries 1333 via programmatic interfaces 1377 of the NHMS. A variety of interfaces may be implemented in different embodiments, such as web-based consoles, APIs (application programming interfaces), command-line tools, and/or various types of graphical user interfaces. A client 1366 may, for example, submit a query logically equivalent to "Is the network connection between GVM1 and GVM2 operating normally?", or "Can something be done to improve the network throughput between GVM3 and GVM4"? In response to receiving such a query or complaint, an NHMS node may utilize VCS GVM-to-host mappings or other configuration metadata to identify the particular virtualization hosts (or other EPPC-containing elements) which are pertinent to the client's concerns. If packet tracking sessions are already in progress with respect to the EPPCs that may be handling the client's traffic, the metrics collected from those sessions may be reexamined in view of the client's concerns. If new packet tracking sessions are needed to respond to the client's concerns, they may be established as high priority sessions in at least some embodiments (e.g., with the help of a force flag).

NHMS Request Types

Figure 14:
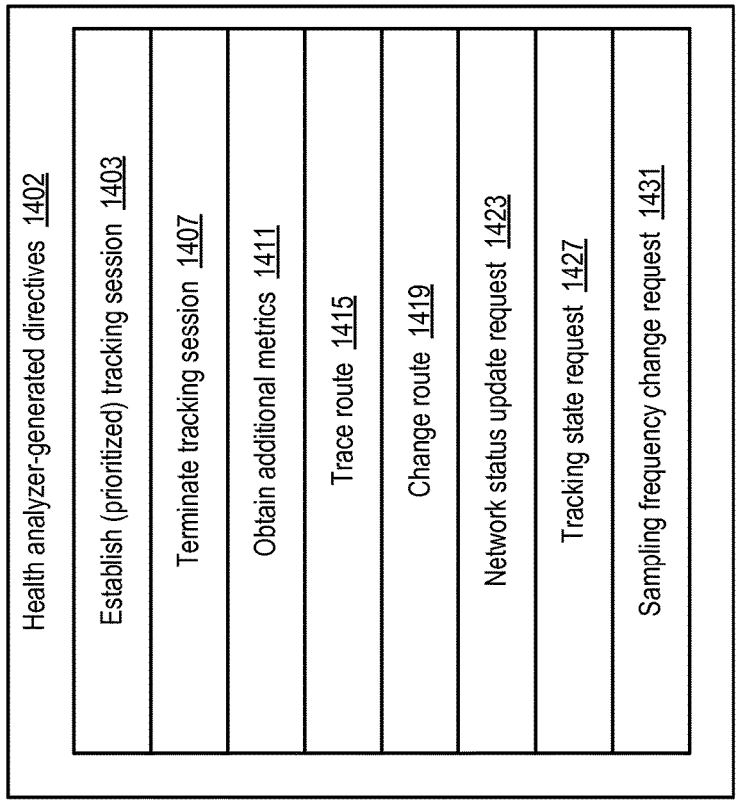
FIG. 14 illustrates examples of types of directives which may be generated by a health analyzer of a network health management service and transmitted to encapsulation protocol processing components, according to at least some embodiments.

FIG. 14 illustrates examples of types of directives 1402 which may be generated by a health analyzer of a network health management service and transmitted to encapsulation protocol processing components, according to at least some embodiments. A directive of type 1403 may instruct an EPPC to establish a new packet tracking session, e.g., in the role of a TX EPPC. The particular peer EPPC with which the session should be established (with the peer EPPC in the role of the RX EPPC) may be indicated in the session establishment directive in some cases. In at least some embodiments the directive may indicate a relative priority of the to-be-established session relative to other sessions, and/or other session parameters such as the metrics to be collected, the frequency of metric collection and reporting, and/or a minimum or maximum duration of the session. If the session to be established is assigned a high priority, the TX EPPC may set the force flag in its TX capabilities message during the session establishment handshake procedure as discussed above. In some embodiments, the network health management service (NHMS) may send respective directives to initiate the establishment of some or all packet tracking sessions—e.g., instead of requesting the establishment of sessions only after analyzing network health update messages, the NHMS nodes may proactively decide which portions of the VCS network require additional tracking and instruct EPPCs to establish sessions accordingly. The NHMS may have access to metadata indicating the topology of the VCS network and the mappings between GVMs and virtualization hosts in various embodiments, for example. Using such metadata, the NHMS nodes may identify portions of the VCS network whose traffic is not being tracked as thoroughly as that of other portions, and issue directives to increase the coverage of the less-tracked portions. In some embodiments, the NHMS may send respective directives to establish a session to both EPPCs that are to participate in the session: e.g., one directive to the TX EPPC, and another to the RX EPPC. In various embodiments, the NHMS nodes may determine that enough metrics have been collected (at least for the present) for a given tracking session, and send a directive to terminate the tracking session (directive type 1407).

In various embodiment an NHMS node may send a directive to a TX EPPC to obtain additional metrics (type 1411). Such requests for additional metrics may be sent, for example, after the NHMS has examined some set of network status update messages from the TX EPPC, and has determined that a follow-up investigation or diagnosis of a potential impairment or failure is appropriate. In at least some embodiments, the types of additional metric needed for the impairment diagnosis (which could include, for example, latency metrics, route tracing metrics or the like as well as loss-related or corruption-related metrics), the amount of time for which the additional metrics should be collected, and/or the encapsulation header settings to be used to obtain the additional metrics (such as the traceroute probe flag) may be indicated in the obtain additional metrics directive 1411. In some cases the additional metrics directive may indicate that more of the metrics that were already being collected should be obtained, or that the metrics should be collected/reported more frequently.

The NHMS may also transmit trace route directives 1415 and/or change route directives 1419 to TX EPPCs in various embodiments. In response to a trace route directive, for example, the TX EPPC may set the traceroute probe flag 624 shown in FIG. 6 in some number of administrative encapsulation packets (i.e., packets which do not contain baseline packets associated with client applications), and collect the responses to those administrative encapsulation packets to identify the intermediary devices along a path to the RX EPPC. Information about the traced route may be provided to the NHMS in a response to the trace route directive. In the case of a change route directive 1419, the TX EPPC may modify the source UDP port (or some other route variation parameter of the kind discussed in the context of FIG. 11) for subsequent encapsulation packets sent to the RX EPPC, thereby resulting in the selection of a different set of network links for the path taken by the subsequent encapsulation packets to the RX EPPC.

In the depicted embodiment, an NHMS node or component may send a request 1423 for a network status or health update to a TX EPPC of a session, e.g., instead of waiting for the TX EPPC to schedule the update on its own. In some embodiments, an NHMS component may request, using a directive of type 1427, information about the tracking state of an EPPC. Such state directives may be sent to either the TX EPPC or the RX EPPC of a session in some embodiments, and/or to EPPCs which are not currently participating in a session in either role. In some implementations the tracking state directives 1427 may indicate a pair of EPPCs with respect to which the state information is to be provided. Possible responses to a status request may include, for example, "no session", "snooping" (watching for traffic prior to potentially setting up a session), "handshake started" (indicating that a TX capabilities message has been sent), "handshake retry" (indicating that a handshake is being re-attempted after the previous attempt did not succeed), "handshake failed (due to no response, or due to lack of tracking resources)", "tracking-in-progress" (indicating how long the tracking session has been in progress), "session-ended" (indicating that the session is being terminated and its resources are being freed), etc. In at least one embodiment a directive 1431 to increase or decrease the sampling frequency with respect to packets containing customer data may be sent to a TX EPPC. For example, if every fourth baseline packet was being tracked by tagging its encapsulation headers, the TX EPPC may be requested to tag every third packet (thus increasing the sampling frequency) or to tag every eighth packet (thus decreasing the sampling frequency). The sampling frequency may be reduced, for example, if it is evident at the NHMS that no performance problems are being experienced in the session; and the sampling frequency may be increased if the collection of additional data points appears to be appropriate. Other types of NHMS-to-EPPC directives than those shown in FIG. 14 may be employed in some embodiments, and one or more of the kinds of directives indicated in FIG. 14 may not be used in other embodiments.

Investigation of Suspect Network Links

Figure 15:
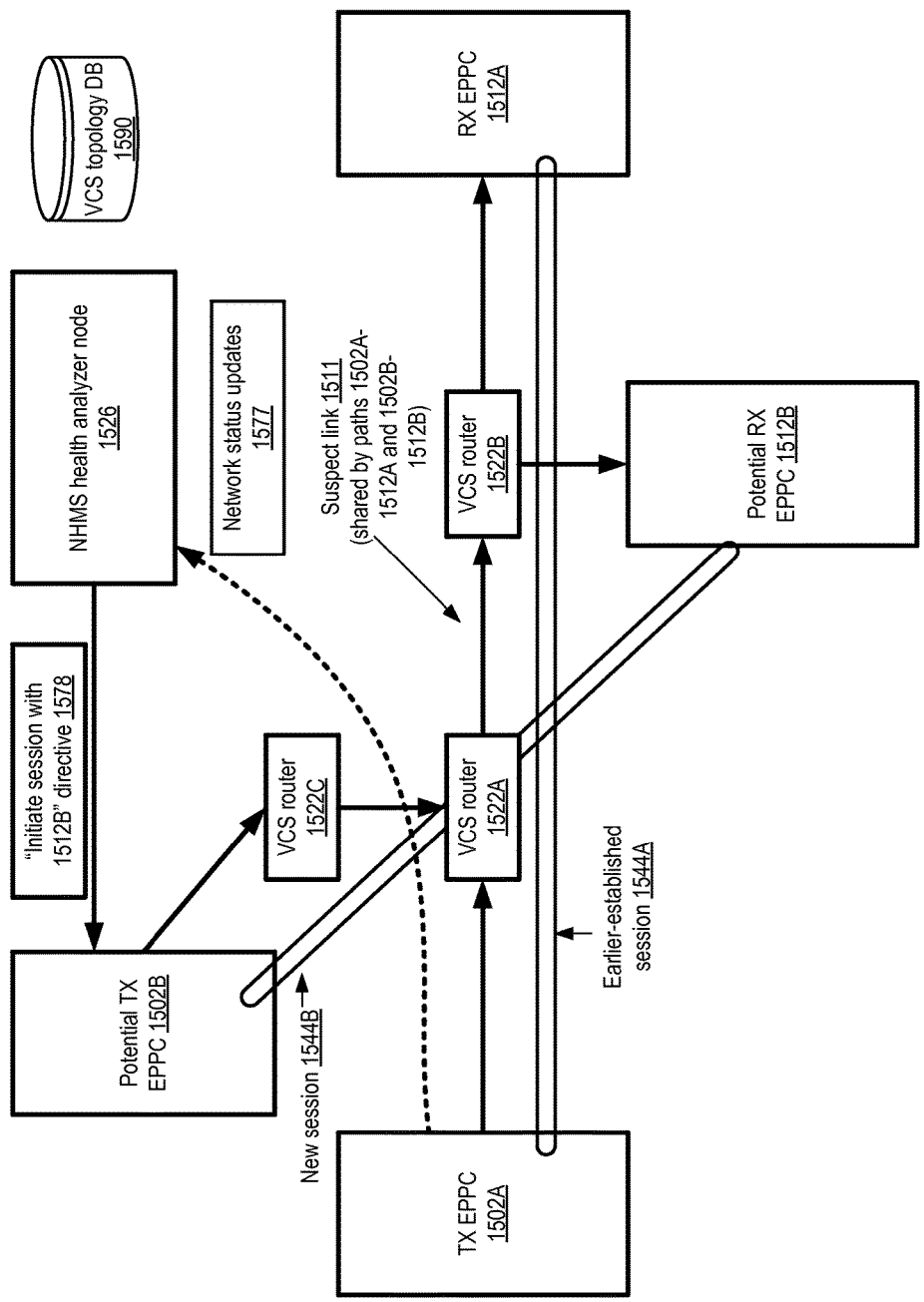
FIG. 15 illustrates an example of a tracking session established at the request of a health analyzer of a network health management service to investigate a potentially impaired network link, according to at least some embodiments.

FIG. 15 illustrates an example of a tracking session established at the request of a health analyzer of a network health management service to investigate a potentially impaired network link, according to at least some embodiments. In the depicted scenario, packet tracking session 1544A is established first, with TX EPPC 1502A and RX EPPC 1512A. The paths taken by at least some encapsulation packets between TX EPPC 1502A and RX EPPC 1512A include a link between VCS router 1522A and 1522B. As part of the session 1544A, TX EPPC 1502A sends one or more network status update messages 1577 to a health analyzer node 1526 of a network health management service associated with the VCS at which the EPPCs are configured. The health analyzer node 1526 examines the metrics provided by the TX EPPC 1502A (e.g., in combination with metrics provided by other sources), and determines that further investigation of a potential impairment of the network links between the TX EPPC 1502A and the RX EPPC 1512A is warranted. The health analyzer node 1526 may have access to a VCS topology database 1590 which indicates the placement of various EPPCs relative to the VCS routers in the depicted embodiment. The health analyzer node may be able to identify another pair of EPPCs 1502B and 1512B, such that customer traffic is flowing from EPPC 1502B to 1512B along a path which has link 1511 (between routers 1522A and 1522B) in common with the path being used for packets of session 1544A.

In order to obtain more data to determine whether the suspect link 1511 is actually impaired, the network health analyzer node 1526 may send a directive 1578 to EPPC 1502B to establish a new packet tracking session 1544B with EPPC 1512B as the RX EPPC. In some embodiments, the directive 1578 may also include instructions to choose the route variation parameters such that link 1511 is used for at least a portion of the proposed session 1544B. In response to directive 1578, TX EPPC 1502B may initiate a session establishment handshake of the kind discussed above with potential RX EPPC 1512B. After the session 1544B is set up, the TX EPPC 1502B may obtain metrics reflecting the state of suspect link 1511 and provide them to the NHMS. The data provided by the TX EPPC may help the network health analyzer 1526 to make a more informed decision as to whether the suspect link 1511 is impaired or not. In various embodiments, based on the VCS topology and other VCS configuration details, NHMS health analyzers may be able to use health updates from packet tracking sessions whose packet routes overlap to distinguish between suspect links and un-impaired links that appear to be performing as expected, and then to confirm whether a given suspect link is actually impaired. Additional packet tracking sessions may be set up specifically to investigate whether a performance problem really exists with respect to a given link, and/or to verify that another link is un-impaired. In at least some embodiments, the NHMS may maintain a database of entries representing respective VCS network devices and links. Individual entries of such a database may be updated based on the latest metrics analyzed at the NHMS to categorize the corresponding device or link into one of various states, such as "un-impaired", "suspect", "impaired", or "insufficient recent metrics available" states.

In scenarios in which several different paths are available between a given pair of EPPCs, the ability of the NHMS to classify particular links along the paths as un-impaired, suspect or impaired may be very useful in quickly responding to performance problems—for example, traffic may be routed around a suspect or impaired link using a set of confirmed un-impaired links. The scenario depicted in FIG. 15 represents one example of the NHMS's role as an aggregator and analyzer of data obtained from various sources (e.g., from the EPPCs, the VCS topology database 1590, VCS GVM-to-host mappings, etc.) in an effort to identify and respond to VCS network problems quickly. If the suspect link 1511 is found to be impaired, the NHMS may initiate any of various remedial actions in the depicted embodiment: for example, by sending an alert to an administrator, changing routing settings to avoid link 1511, or taking one or more VCS routers offline (assuming alternate paths are available for the packets which would have been handled by the targeted routers).

Network Health Management Tunable Parameters

As discussed above, a number of decisions may have to be made regarding packet tracking, reporting of collected metrics, and responses to the analysis of collected network metrics. In at least some embodiments the network health management service and the tracking-related subcomponents of the EPPCs may be designed as a flexible framework, various aspects of which may be tuned or adjusted as needed. FIG. 16 illustrates example parameters which may be tuned for encapsulation protocol-based packet tracking, according to at least some embodiments. As shown, network health management tunable parameters 1602 may be broadly categorized into the following classes: tracking session establishment parameters 1603, session termination parameters 1607, sampling parameters 1611, route changing parameters 1615, metrics collection and reporting triggers 1619, impairment detection thresholds 1623, follow-up request parameters 1627, tracking overhead limit parameters 1631, remedial action parameters 1635, and/or client-customizable parameters 1639.

Tracking session establishment parameters 1603 may control, for example, the amount of time for which a connection has to remain established between a TX EPPC and a peer EPPC for the peer EPPC to be considered a candidate for a packet tracking session, the number of bytes or packets that have to be transmitted over the connection for the peer EPPC to be considered a candidate, the minimum or maximum rate (e.g., in bytes/second or packets/second) at which traffic has to flow between the two EPPCs to trigger the establishment of a new session, the minimum time interval that must have elapsed since the termination of a previous session with the peer EPPC before a new session can be established, the minimum time interval that must have elapsed since the peer EPPC last rejected a session establishment request from the TX EPPC before a new session can be established, the amount of memory and/or other tracking resources that have to be available in the respective tracking resource pools of the TX EPPC and the proposed RX EPPC for a new session, whether the TX EPPC can initiate a session establishment handshake on its own initiative or whether the session establishment has to be triggered by a directive from the network health management service (NHMS), and so on.

Session termination parameters 1607 may include, for example, how long (in time) a packet tracking session is to be maintained before it is terminated, the minimum or maximum number of packets containing client-generated baseline packets that are to be tracked before terminating a session, whether the decision to terminate a session is to be made at the initiative of the TX EPPC, the RX EPPC or the network health management service, and the like. In some embodiments, a session may be terminated if the rate of client traffic (i.e., the rate of transmission of baseline packets contained in trackable encapsulation packets) falls below a threshold, and the threshold for abandoning or terminating the session based on a lack of sufficient traffic may be designated a tunable parameter. Session termination parameters 1607 may also include the maximum permitted delay between the sending of a TX capabilities message from the TX EPPC and the receipt at the TX EPPC of a corresponding RX capabilities message in some embodiments. If the RX capabilities message is not received before the maximum permitted delay, the session establishment handshake may be abandoned.

Sampling parameters 1611 may indicate the default fraction of baseline packets whose encapsulation packets should be tracked for a given packet tracking session, whether the fraction should be changed as a function of the rate at which baseline packets are being generated (and if so, how the fraction should be changed), the algorithm (e.g., random sampling or deterministic selection) to be used to select the particular packets to be tracked, and so on. Route changing parameters 1615 may govern the triggering conditions for varying the route (e.g., the set of host-to-router, router-to-router, and/or router-to-host links) used for encapsulation packets between a pair of EPPCs. For example, in one embodiment, based at least in part on a route changing parameter, a TX EPPC may change the source UDP port (which is used as an input to a hash function used to select the route for encapsulation packets) after every K packets sent to the RX EPPC, or after every T seconds. The manner in which the next route should be selected (e.g., whether a new source UDP port should be selected at random from among the usable set of ports, or whether UDP ports should be selected sequentially from the usable set) may also be indicated via a tunable parameter in at least some embodiments. A tunable parameter may also indicate whether the TX EPPC is permitted to change routes on its own initiative or only in response to a request from the network health management service.

In some embodiments, tunable parameters for metrics collection and reporting triggers 1619 may indicate when (e.g., how frequently) metrics are to be collected at the TX EPPC from the RX EPPC, when network health update messages are to be prepared and transmitted to the NHMS by a TX EPPC, and so on. In one embodiment, for example, the TX EPPC may be configured to perform a preliminary level of analysis on the metrics obtained from the RX EPPC, and compute some derived metrics such as a packet loss rate or a packet corruption rate based on its own (the TX EPPC's) count of the total number of packets sent to the RX EPPC. The TX EPPC may send a network health update message to the NHMS only if the derived metrics meet some threshold criteria—e.g., if the packet loss rate exceeds X percent. In other embodiments, the tunable parameter for reporting triggers 1619 may be set in such a way that the TX EPPC is required to send network health update messages to the NHMS periodically or on demand regardless of the value of the derived or raw metrics. The particular metrics (e.g., raw metrics, or derived metrics) which are to be sent to the NHMS for a given session may also be indicated via tunable parameters in at least some embodiments. For the NHMS and/or the TX EPPCs, impairment detection thresholds 1623 may be specified as tuning parameters in various embodiments. The impairment detection threshold parameters may specify, for example, the specific metrics values which are to be considered as evidence of respective types of potential network impairment or failures. The follow-up request parameters 1627 may indicate, corresponding to each type of potential or actual impairment or failure, details of the follow-up impairment diagnosis actions which are to be initiated (e.g., the specific additional network metrics to be obtained, the minimum or maximum time intervals for which the additional metrics are to be obtained, the sources from which the metrics should be obtained, and so on).

In some embodiments, the EPPCs and/or the NHMS nodes may obtain metrics indicating the overhead associated with packet tracking. For example, if most baseline packets are relatively small, the encapsulation header fields added for tracking purposes and/or the additional administrative encapsulation packets (which may not contain baseline packets with customer data) used during tracking sessions may represent a substantial fraction of the total amount of bytes transferred among the TX EPPC and the RX EPPC. Tracking overhead limit parameters 1631 may indicate whether and how the overhead associated with tracking is to be computed or estimated, and what actions (if any) are to be taken in response to determining that the overhead has reached a specified threshold. The actions taken may include, for example, a reduction in the number of administrative packets sent, or a decision to sample fewer baseline packets in some embodiments. Remedial action parameters 1635 may indicate, for example, the particular remedial actions to be taken in response to confirmations (or high probabilities) of network link impairments, network device impairment, and the like—e.g., which types of alerts are to be generated and to whom the alerts should be directed, which devices should be taken offline, whether and how routes should be changed, and so on. Client-customizable parameters 1639 may indicate, for example, whether some traffic generated on behalf of a client (e.g., the traffic originating at or directed to a specified subset of guest virtual machines of the client) is to be considered of higher priority from a tracking/monitoring perspective than other traffic of the client. In various embodiments, default values may be set (e.g., as part of the initialization routines for the EPPCs and the NHMS components) for some or all of the kinds of tuning parameters listed in FIG. 16, and the tunable values may be modified as more metrics are collected. In at least one embodiment, the NHMS may include one or more machine learning engines which adjust the tuning parameters over time based on an analysis of the effectiveness of the current settings for the parameters (e.g., how quickly actual network impairments were identified and dealt with, how often false positives were identified with respect to impairment, and so on). In various embodiments, other types of tunable parameters than those shown in FIG. 16 may also or instead be used to manage network health of a virtual computing service.

Methods for Tracking Packets and Network Health Management

Figure 17:
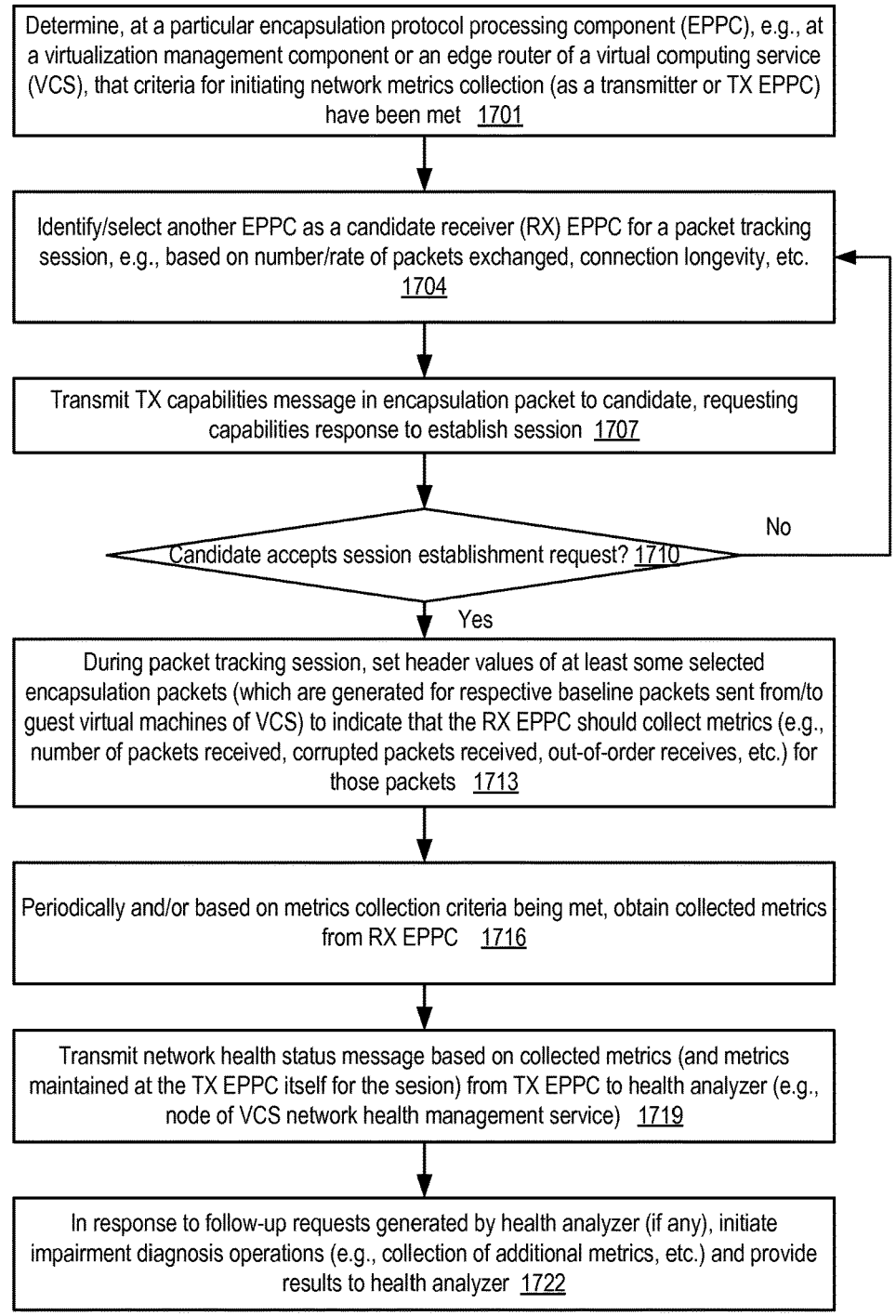
FIG. 17 is a flow diagram illustrating aspects of operations that may be performed by a transmitter encapsulation protocol processing component (TX EPPC), according to at least some embodiments.

FIG. 17 is a flow diagram illustrating aspects of operations that may be performed by a transmitter encapsulation protocol processing component (TX EPPC), according to at least some embodiments. As shown in element 1701, a determination may be made at a given EPPC of a virtual computing service that criteria to establish a packet tracking session to obtain a set of network health metrics have been met, with the EPPC acting as the transmitter or TX EPPC of the session. The EPPC may be implemented or executed at any of various computing devices of the VCS, e.g., as part of a virtualization management component of a virtualization host, at a peripheral device used for offloading network-related processing from the CPUs/cores of a virtualization host, at an edge router used for communications between the VCS and other services of a provider network or between the VCS and external networks, and the like. The decision that a packet tracking session is to be set up may be made based on various factors, such as the availability of tracking resources at the TX EPPC, the receipt of a request or directive from a node of a health management service to establish a session, etc. A set of tracking resources for the session may be reserved at the TX EPPC—e.g., enough memory to store such metrics as the total number of tracked packets sent during the session, as well as other metrics and parameters of the session such as the packet sampling frequency, etc., may be allocated for the session. A peer EPPC may be identified as a potential receiver or RX EPPC for the session (element 1704), e.g., based on any combination of criteria such as the amount or rate of traffic that has been transferred to/from the peer EPPC during some time interval, the longevity of the connection between the two EPPCs (for how long traffic has been transmitted between the two), and so on.

A TX capabilities message (or a logically equivalent packet establishment request) may be sent in a packet formatted in accordance with the encapsulation protocol to the proposed RX EPPC by the TX EPPC (element 1707). The TX capabilities message may request that the RX EPPC respond with its own capabilities message to indicate that the establishment of the session is acceptable to the RX EPPC. In at least some embodiments the TX and/or RX EPPC messages may indicate respective characteristics or properties of the two EPPCs, such as the version of the encapsulation protocol each is capable of processing, performance capacities, the kinds of metrics that the TX EPPC wished to obtain and the kinds of metrics that the RX EPPC can collect, whether the RX EPPC can collect and store different per-route or per-port metrics or not, the units in which the RX EPPC is capable of recording latency, etc. If the proposed RX EPPC does not accept the session establishment request (as detected in element 1710), either by explicitly indicating in the response sent to the TX EPPC that it is not willing to participate in the requested session, or by not responding to the TX EPPC's message within a timeout period, the TX EPPC may decide to identify a different peer EPPC (repeating the operations corresponding to the element 1704 and 1707 with respect to the different peer) in the depicted embodiment.

If a positive response to the session establishment request is received (as also detected in operations corresponding to element 1710), the TX EPPC may start tagging some or all encapsulation packets which contain baseline packets being transmitted to the RX EPPC as tracked packets (element 1713). The baseline packets may have been generated at, and/or directed to, guest virtual machines set up at virtualization hosts of the VCS on behalf of VCS clients, for example. The encapsulation packets may be tagged, for example, by setting a particular header or other bit sequence within encapsulation packets appropriately (e.g., by including a session identifier as indicated in FIG. 6, or some other flag indicating that the packet is to be counted among the packets for which statistics are to be maintained at the RX EPPC during the session). When the RX EPPC receives a tracked encapsulation packet, it may update the session's health metrics, e.g., by incrementing the appropriate counts for total packets received, total bytes received, packets received out of order, corrupted packets, etc.

The metrics being collected and updated at the RX EPPC may be retrieved by the TX EPPC periodically or in response to various collection triggering criteria (element 1716). For example, in some embodiments the metrics may be obtained (e.g., via tracking synchronization requests and corresponding responses from the RX EPPC) at the TX EPPC once every T seconds, or after every K kilobytes of data has been transmitted to the RX EPPC. The TX EPPC may send network health update messages based at least in part on the RX EPPC's metrics (e.g., messages comprising metrics derived from the combination of the RX EPPC's metrics and the TX EPPC's own metrics) to a health analyzer node of a network health management service associated with the VCS in the depicted embodiment (element 1719). If and when the TX EPPC received a follow-up message from the NHMS (element 1722), the TX EPPC may initiate network impairment diagnosis operations indicated in the follow-up messages (such as the collection of route trace information, additional metrics, etc.) in the depicted embodiment.

Figure 18:
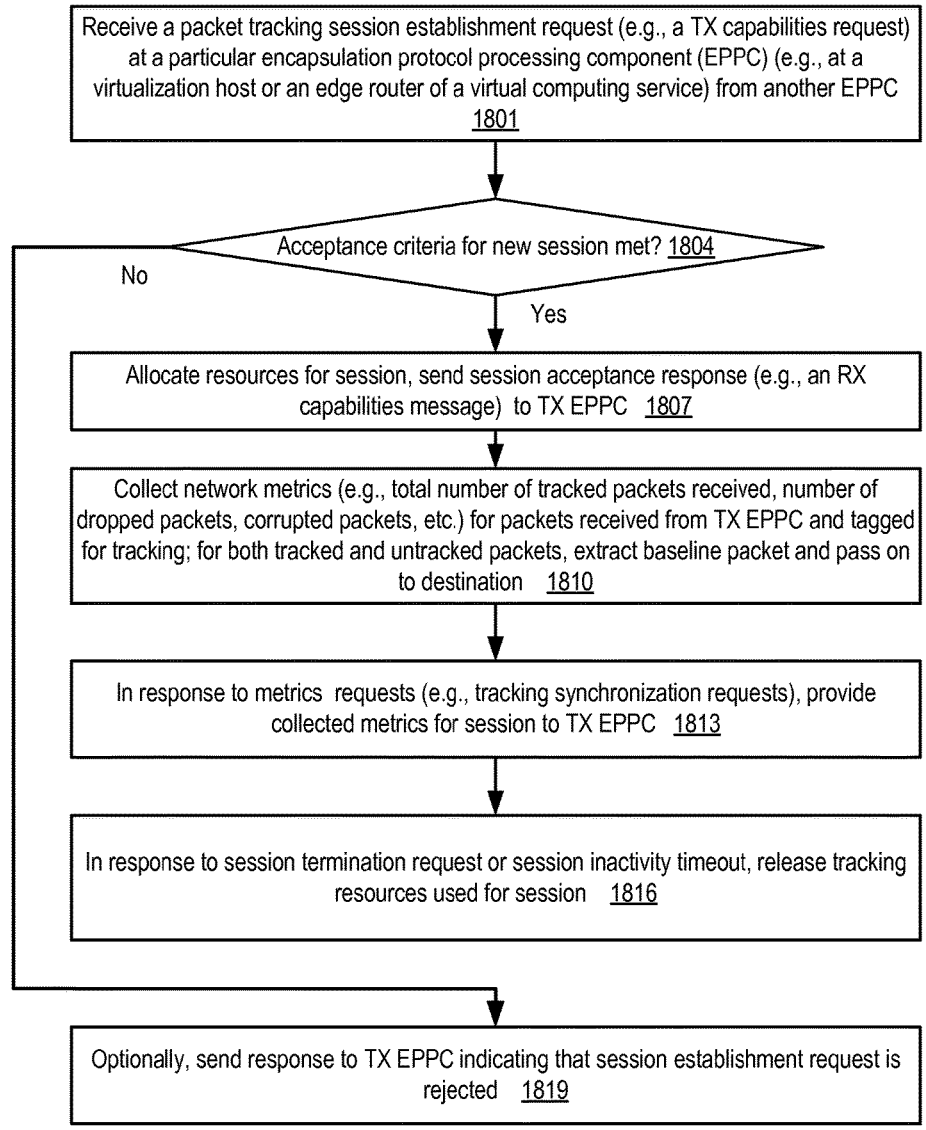
FIG. 18 is a flow diagram illustrating aspects of operations that may be performed by a receiver encapsulation protocol processing component (RX EPPC), according to at least some embodiments.

FIG. 18 is a flow diagram illustrating aspects of operations that may be performed by a receiver encapsulation protocol processing component (RX EPPC), according to at least some embodiments. As shown in element 1801, a request to establish a packet tracking session may be received at a particular EPPC from a TX EPPC, e.g., in the form of a TX capabilities message sent in an encapsulation packet. In some cases the session establishment request's encapsulation packet may itself contain a baseline packet containing a customer application's data, while in other cases an administrative encapsulation packet which does not contain customer data may be used. The receiving EPPC (expected to play the role of an RX EPPC) may be resident at a virtualization management host of a VCS, an edge router of the VCS, or another computing device of the VCS. The receiving EPPC may determine whether one or more criteria for accepting the session establishment request are met, such as whether there are sufficient free tracking resources, whether the types of metrics whose collection is being requested can be collected, and so on. If the acceptance criteria for the proposed session are met (as detected in operations corresponding to element 1804), tracking resources (e.g., memory space sufficient to store the collected metrics and associated metadata) for the session may be reserved, and a session acceptance response (e.g., an RX capabilities message) may be sent back to the EPPC from which the session establishment request was received (element 1807). In at least some embodiments, the message sent to the requester may include various details about the RX EPPC and/or the network path between the TX and RX EPPCs, such as the number of distinct ports for which the RX EPPC can collect separate sets of network metrics, the number of hops encountered by the session establishment request to reach the RX EPPC, performance and/or functional capacities of the RX EPPC, and so on. If the criteria for session establishment are not met at the proposed RX EPPC (as also determined in operations corresponding to element 1804), in some embodiments a message indicating a rejection of the proposed session may optionally be sent to the TX EPPC (element 1819). In other embodiments, a response to the session establishment request message may not be sent, and the absence of a response within a timeout period may be considered by the TX EPPC as the equivalent of a rejection.

After the session has been established, the RX EPPC may collect various metrics for the tracked packets it receives, such as the total number of packets or bytes received, the number of dropped, corrupted or out-of-order packets received, etc. (element 1810). Whether a given encapsulation packet is tracked or not may be determined by examining one or more of the encapsulation headers in various embodiments—e.g., the presence of a non-zero session identifier in a header may indicate that the packet is a tracked packet in some embodiments. At various points during the session, the RX EPPC may receive a request for collected metrics from the TX EPPC (also sent in an encapsulation message, such as a tracking synchronization message). In response to such a request, the metrics collected thus far for the session (or the new set of metrics collected since the previous set of metrics were transmitted to the TX EPPC) may be provided to the requester (element 1813). In some embodiments, the RX EPPC may send at least some collected metrics to the TX EPPC on its (the RX EPPC's) initiative, e.g., without waiting for a specific metrics request. Eventually, the packet tracking session may be terminated (element 1816), e.g., either as a result of an explicit session termination request sent in an encapsulation packet by the TX EPPC, or if the RX EPPC has not received any communication or request from the TX EPPC for some threshold time period.

Figure 19:
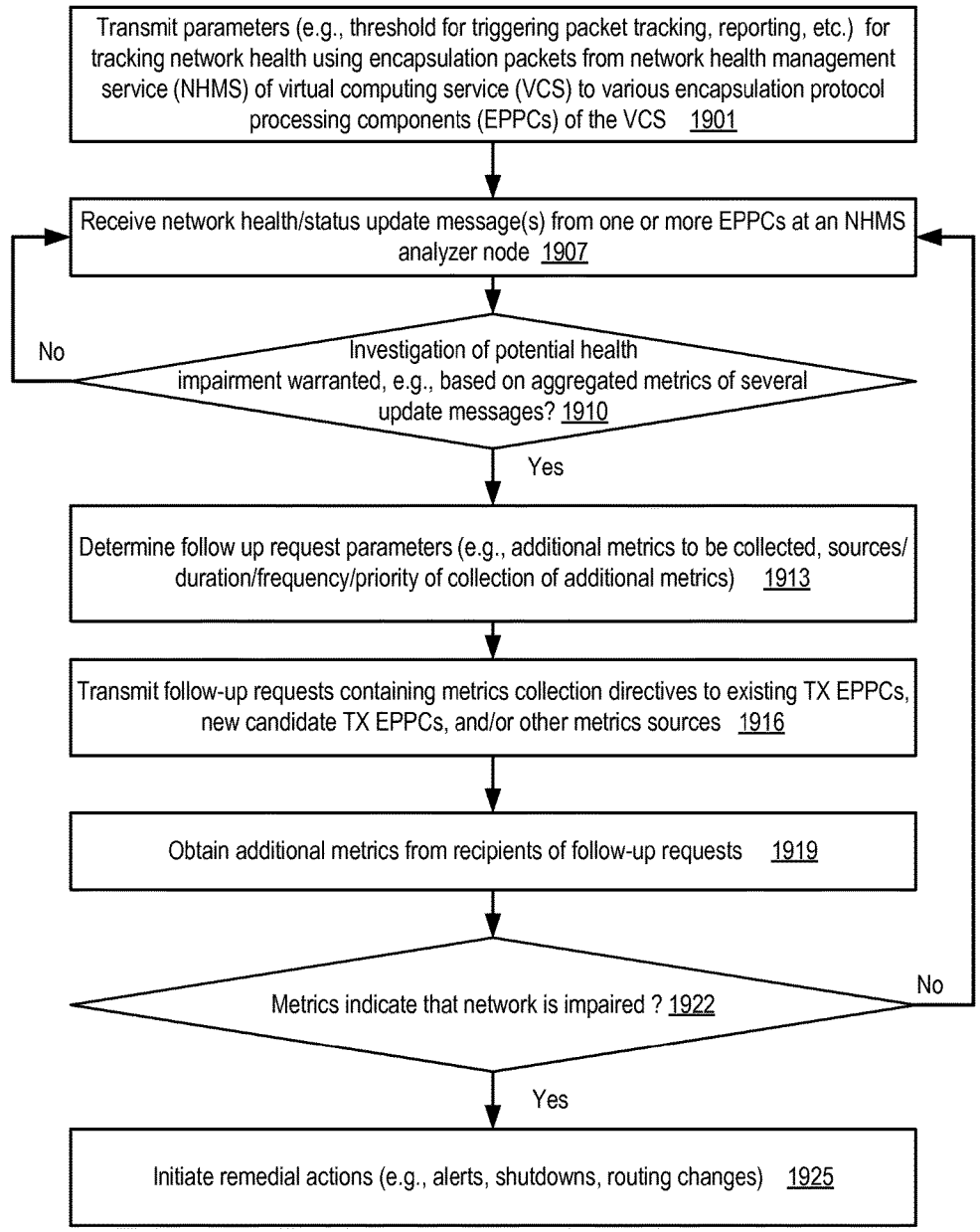
FIG. 19 is a flow diagram illustrating aspects of operations that may be performed by one or more nodes of a network health management service at which encapsulation protocol-based packet tracking is implemented, according to at least some embodiments.

FIG. 19 is a flow diagram illustrating aspects of operations that may be performed by one or more nodes of a network health management service (NHMS) at which encapsulation protocol-based packet tracking is implemented, according to at least some embodiments. In the depicted embodiment, the NHMS may comprise a plurality of health analyzer nodes distributed among one or more data centers of the VCS. As shown in element 1901, various parameters for tracking network health of a VCS may be sent from the nodes of the NHMS to EPPCs at virtualization hosts, edge routers and/or other devices responsible for implementing respective sets of functions of an encapsulation protocol of the VCS. In some embodiments the parameters may be transmitted at initialization—e.g., when a new virtualization host is brought online, the parameters may be read by its EPPC before any guest virtual machines are instantiated. Any combination of different kinds of parameters discussed in the context of FIG. 16 may be provided to the EPPCs in various embodiments, including for example thresholds for triggering packet tracking sessions, reporting network health updates, etc. At least some of the parameters may be dynamically tunable in some embodiments, so that, for example, a parameter update may be sent to an EPPC during the course of a given session and applied to the remainder of the session.

A network health analyzer node of the NHMS may receive a network health update message from an EPPC, containing a set of network metrics (such as packet loss metrics, packet corruption metrics, metrics of successful packet deliveries, latency metrics, etc.) collected at or derived at one or both EPPCs participating in a packet tracking session (element 1904). The health analyzer may examine the contents of the received message, e.g., in combination with other network health update messages received earlier and/or in the context of other metrics from sources other than EPPCs, and determine whether an investigation of a potential network health impairment or failure is justified or warranted. Any of a number of different criteria or probability thresholds may be used to determine whether further investigation is appropriate in various embodiments. If the NHMS health analyzer determines that no further investigation is required (e.g., in operations corresponding to element 1910) for a given update message, the health analyzer may process additional health update messages as they are received, and repeat the operations corresponding to elements 1904 and 1910 until a particular health update message requires further investigation.

Parameters of a respective follow-up request to be sent to one or more metrics sources (such as the EPPC from which the triggering health update message was received) may be determined at the health analyzer node (element 1913). The parameters may include, for example, the particular metrics to be obtained (which may include details of the routes taken by packets between the pair of EPPCs of a session, new metrics such as the count of ECNs which may not have been collected in earlier parts of the session, or additional data points for metrics which were already being collected), the duration for which the additional metrics should be collected, the frequency at which the new metrics should be collected or reported back to the NHMS, the relative priority of the new metrics with respect to other currently-collected metrics, etc. Follow-up requests containing directives to collect the metrics required for the proposed investigation may then be transmitted from the NHMS (element 1916), e.g., to the participant EPPCs of the existing session, to EPPCs which are currently not participating in a session, or other network devices which serve as metrics sources of the VCS.

The additional metrics requested to support the investigation of potential network impairments may be received at the NHMS (element 1919) from the recipients of the follow-up requests. If an analysis of the additional metrics does not reveal an actual network impairment (or at least a high probability that an actual impairment or failure has occurred), as detected in operations corresponding to element 1922, the NHMS nodes may wait for further network health updates and repeat the operations corresponding to elements 1907 onwards for the new updates. If a network impairment is identified, as also detected in operations corresponding element 1922, one or more remedial operations may be initiated to recover from or mitigate the impairment (element 1925). Such remedial actions may include, for example, generating alerts for network administrators, taking impaired or defective network devices offline, bypassing impaired devices or links via routing changes, etc. In different embodiments, some or all of the administrative messages being sent from one EPPC to another (such as session establishment/termination messages, tracking synchronization-related messages, trace route requests, etc.) and/or between an EPPC and the NHMS (such as network health update messages, follow-up messages and the like) may be incorporated within packets formatted according to the VCS's encapsulation protocol itself, so that no additional protocols have to be implemented specifically for health management purposes. In at least some embodiments, the VCS encapsulation protocol may be designed to be extensible so that new types of health management-related functionality can be added on as needed.

It is noted that in various embodiments, some of the operations shown in the flow diagrams of FIG. 17, FIG. 18 and FIG. 19 may be implemented in a different order than that shown in the figure, or may be performed in parallel rather than sequentially. Additionally, some of the operations shown in one or more of the flow diagrams may not be required in one or more implementations.

Use Cases

The techniques and algorithms described above, of tracking at least some encapsulation packets prepared on behalf of applications running at guest virtual machines of a virtual computing service (VCS) to identify potential network impairments, and of using a network health management service to aggregate collected metrics to investigate and respond to specific impairments, may be useful in a variety of environments. Health management techniques which rely on dedicated agents run specifically for capturing ping results or heartbeat responses may in some cases fail to identify network-related problems experienced by customers quickly enough, since the customers' traffic patterns and/or routes may differ from those of the dedicated agents. By tagging selected encapsulation packets which would have been prepared for conveying customer data anyway, it may become possible to capture the customer experience more accurately. By adjusting the parameters of packet tracking sessions, such as the rate at which packets are sampled for tracking, the overhead associated with collection of network health data may be minimized. The implementation of detailed analysis of aggregated metrics at back-end nodes of a health management service, rather than at devices which are involved in customer traffic flow themselves, may increase the chances of identifying network impairments quickly while minimizing the impact on customer traffic.

Illustrative Computer System

Figure 20:
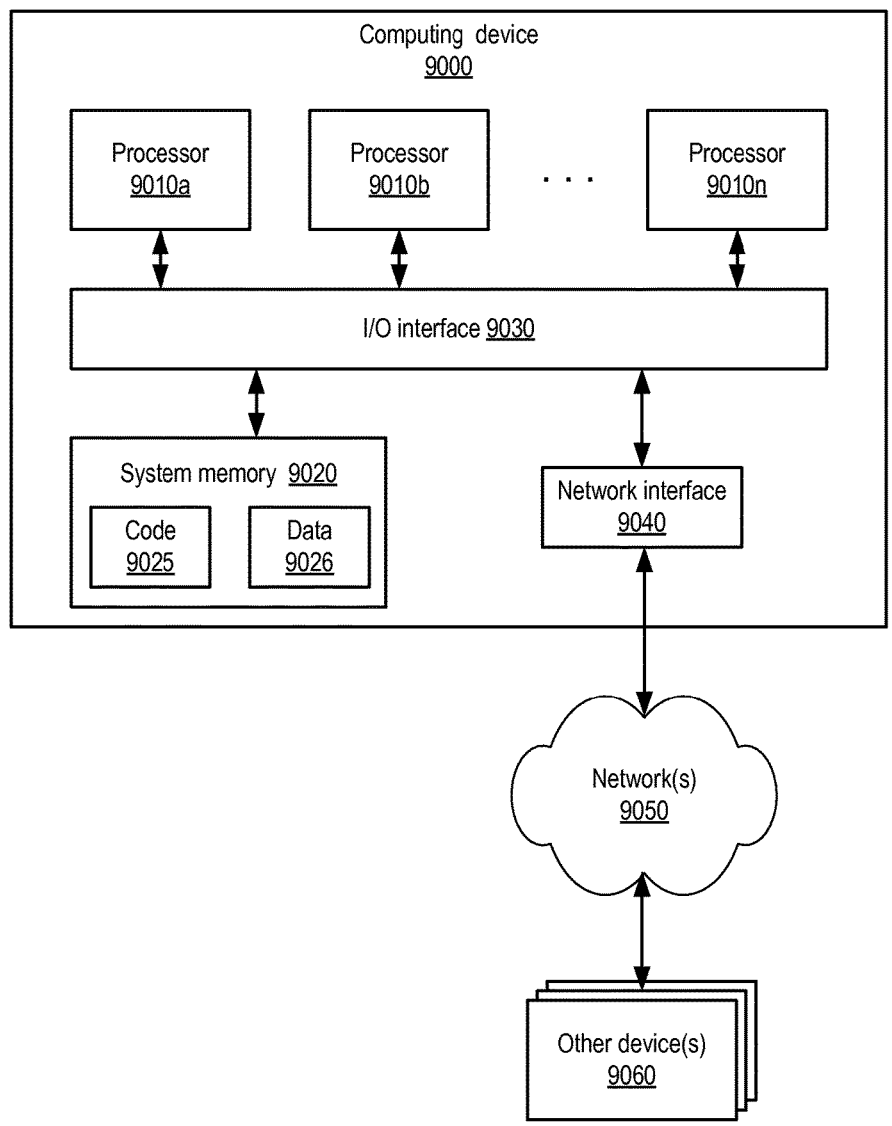
FIG. 20 is a block diagram illustrating an example computing device that may be used in at least some embodiments.

In at least some embodiments, a server that implements one or more of the techniques described above for network packet tracking and network health management, including virtualization hosts and NHMS nodes, may include a general-purpose computer system that includes or is configured to access one or more computer-accessible media. FIG. 20 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 19, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol. In one embodiment, computing device 9000 may include a peripheral device used for offloading networking-related processing tasks from processors 9010.

In some embodiments, system memory 9020 may be one embodiment of a computer-accessible medium configured to store program instructions and data as described above for FIG. 1 through FIG. 19 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 20 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
performing, by a first encapsulation protocol processing component at a first virtualization host of a virtual computing service:
identifying a second encapsulation protocol processing component at a second virtualization host of the virtual computing service as a candidate with which to establish a packet tracking session to collect network health metrics associated with network traffic of the first virtualization host during the packet tracking session;
initiating an establishment of the packet tracking session between the first encapsulation protocol processing component and the second encapsulation protocol processing component;
selecting, as a first tracked packet of one or more tracked packets of the packet tracking session, an encapsulation packet prepared at the first encapsulation protocol processing component for transmission to the second virtualization host, wherein the encapsulation packet comprises a particular baseline packet generated at a first guest virtual machine instantiated at the first virtualization host, and wherein the particular baseline packet indicates a second guest virtual machine instantiated at the second virtualization host as a destination;
obtaining, from the second encapsulation protocol processing component, one or more network health metrics corresponding to the one or more tracked packets;
transmitting at least a first network health update message corresponding to the packet tracking session to a network health analyzer, wherein contents of the first network health update message are based at least in part on the one or more network health metrics; and
initiating, in response to a follow-up request generated by the network health analyzer, one or more network impairment diagnosis operations, wherein the follow-up request is generated based at least in part on an examination of the first network health update message.

2. The method as recited in claim 1, wherein a particular network health metric of the one or more network health metrics obtained from the second encapsulation protocol processing component comprises one or more of: (a) a number of encapsulation packets received by the second encapsulation protocol processing component, (b) a number of corrupted packets received by the second encapsulation protocol processing component, (c) a number of packets received out of order by the second encapsulation protocol processing component, (d) a number of explicit congestion notifications (ECNs) received by the second encapsulation protocol processing component, or (e) a latency metric.

3. The method as recited in claim 1, wherein said initiating the establishment of the network packet tracking session comprises performing, by the first encapsulation protocol processing component:

selecting, from a pool of tracking resources, a particular tracking resource to store data to be used to generate at least the first network health update message; and determining that network traffic between the first virtualization host and the second virtualization host meets a threshold criterion.

4. The method as recited in claim 3, wherein said determining that the network traffic between the first virtualization host and the second virtualization host meets a threshold criterion is based at least in part on one or more of: (a) a length of a time interval during which encapsulation packets have been transmitted between the first virtualization host and the second virtualization host, (b) a number of encapsulation packets which have been transmitted between the first virtualization host and the second virtualization host during a particular time interval, (c) a number of bytes which have been transmitted between the first virtualization host and the second virtualization host during a particular time interval, or (d) a length of a time interval for which a network packet tracking session has not been established between the first and second encapsulation protocol processing components.

5. The method as recited in claim 1, further comprising performing, by the first encapsulation protocol processing component:

determining one or more route variation parameters for network packets transmitted between the first encapsulation protocol processing component and second encapsulation protocol processing component, wherein the one or more route variation parameters include a number of network ports available at the second encapsulation protocol processing component; and setting, based at least in part on the one or more route variation parameters, a particular header value of a second tracked packet of the one or more tracked packets, such that a route traversed by the second tracked packet to reach the second virtualization host comprises at least one network link which was not traversed by the first tracked packet.

6. A system, comprising:

a first encapsulation protocol processing component of a first computing device of a virtual computing service;

wherein the first encapsulation protocol processing component is configured to:

initiate an establishment of a network packet tracking session between the first encapsulation protocol processing component and a second encapsulation protocol processing component of a second computing device of the virtual computing service;

select, as a first tracked packet of one or more tracked packets of the packet tracking session, an encapsulation packet prepared at the first encapsulation protocol processing component for transmission to the second computing device, wherein the encapsulation packet comprises a particular baseline packet generated at a first guest virtual machine;

obtain one or more network health metrics corresponding to the one or more tracked packets from the second encapsulation protocol processing component; and transmit a first network health update message corresponding to the packet tracking session to a network health analyzer, wherein contents of the first network health update message are based at least in part on the one or more network health metrics.

7. The system as recited in claim 6, wherein a particular network health metric of the one or more network health metrics obtained from the second encapsulation protocol processing component comprises one or more of: (a) a number of encapsulation packets received by the second encapsulation protocol processing component, (b) a number of corrupted packets received by the second encapsulation protocol processing component, (c) a number of packets received out of order by the second encapsulation protocol processing component, (d) a number of explicit congestion notifications (ECNs) received by the second encapsulation protocol processing component, or (e) a latency metric.

8. The system as recited in claim 6, wherein to initiate the establishment of the network packet tracking session, the first encapsulation protocol processing component is configured to:

select, from a pool of tracking resources of the first computing device, a particular tracking resource to store data to be used to generate at least the first network health update message; and determine that network traffic between the first computing device and the second computing device meets a threshold criterion.

9. The system as recited in claim 8, wherein the first encapsulation protocol processing component is configured to determine that the network traffic between the first computing device and the second computing device meets a threshold criterion based at least in part on one or more of: (a) a length of a time interval during which encapsulation packets have been transmitted between the first computing device and the second computing device, (b) a number of encapsulation packets which have been transmitted between the first computing device and the second computing device during a particular time interval, (c) a number of bytes which have been transmitted between the first computing device and the second computing device during a particular time interval, or (d) a length of a time interval during which a network packet tracking session has not been established between the first and second encapsulation protocol processing components.

10. The system as recited in claim 6, wherein the first encapsulation protocol processing component is configured to:

determine one or more route variation parameters for network packets transmitted between the first computing device and second computing device, wherein the one or more route variation parameters include a number of network ports available at the second computing device; and set, based at least in part on the one or more route variation parameters, a particular header value of a second tracked packet of the one or more tracked packets, such that a route traversed by the second tracked packet to reach the second computing device comprises at least one network link which was not traversed by the first tracked packet.

11. The system as recited in claim 10, wherein the first encapsulation protocol processing component is configured to:

indicate, in the first network health update message, that a first network health metric corresponds to a first route traversed by one or more encapsulation packets between the first and second network devices, and that a second network health metric corresponds to a second route traversed by one or more encapsulation packets between the first and second computing devices.

12. The system as recited in claim 6, wherein the first encapsulation protocol processing component is configured to:

set a particular bit sequence of the first encapsulation packet to a particular value to indicate to the second encapsulation protocol processing component that the first encapsulation packet is a tracked packet;

in response to determining that a different encapsulation packet to be transmitted to the second encapsulation protocol processing component is not to be tracked, set the particular bit sequence of the different encapsulation packet to a value other than the particular value.

13. The system as recited in claim 6, wherein the first computing device comprises a first virtualization host at which one or more guest virtual machines including the first guest virtual machine are instantiated, wherein the first encapsulation protocol processing component is executed at least in part at one or more of: (a) a hypervisor of the first virtualization host, (b) an administrative operating system instance of the first virtualization host, or (c) a network processing peripheral device.

14. The system as recited in claim 6, wherein the first computing device comprises an edge router of the virtual computing service.

15. The system as recited in claim 6, wherein the second computing device comprises one of: (a) a virtualization host of the virtual computing service or (b) an edge router of the virtual computing service.

16. The system as recited in claim 6, wherein the first encapsulation protocol processing component is configured to:

transmit, as part of a session establishment handshake, a capability request message to the second encapsulation protocol processing component;

determine, based at least in part on a capability response message received from the second encapsulation processing component as part of the session establishment handshake procedure, a number of network hops traversed by the capability request message; and include the number of network hops in the first network health update message.

17. A non-transitory computer-accessible storage medium storing program instructions that when executed on one or more processors implement a first encapsulation protocol processing component at a first computing device of a virtual computing service, wherein the first encapsulation protocol processing component is configured to:

initiate an establishment of a network packet tracking session between the first encapsulation protocol processing component and a second encapsulation protocol processing component, wherein the second encapsulation protocol processing component is instantiated at a second computing device of the virtual computing service;

select, as a first tracked packet of one or more tracked packets of the packet tracking session, an encapsulation packet prepared at the first encapsulation protocol processing component for transmission to the second computing device, wherein the encapsulation packet comprises a particular baseline packet generated at a first guest virtual machine;

obtain one or more network health metrics corresponding to the one or more tracked packets from the second encapsulation protocol processing component; and transmit a first network health update message corresponding to the packet tracking session to a network health analyzer, wherein contents of the first network health update message are based at least in part on the one or more network health metrics.

18. The non-transitory computer-accessible storage medium as recited in claim 17, wherein a particular network health metric of the one or more network health metrics obtained from the second encapsulation protocol processing component comprises one or more of: (a) a number of encapsulation packets received by the second encapsulation protocol processing component, (b) a number of corrupted packets received by the second encapsulation protocol processing component, (c) a number of packets received out of order by the second encapsulation protocol processing component, (d) a number of explicit congestion notifications (ECNs) received by the second encapsulation protocol processing component, or (e) a latency metric.

19. The non-transitory computer-accessible storage medium as recited in claim 17, wherein to initiate the establishment of the network packet tracking session, the first encapsulation protocol processing component is configured to:

determine that a pool of tracking resources includes a free tracking resource to be used to store data to be used to generate at least the first network health update message; and determine that network traffic between the first computing device and the second computing device meets a threshold criterion.

20. The non-transitory computer-accessible storage medium as recited in claim 19, wherein the first encapsulation protocol processing component is configured to determine that the network traffic between the first computing device and the second computing device meets a threshold criterion based at least in part on one or more of: (a) a length of a time interval during which encapsulation packets have been transmitted between the first computing device and the second computing device, (b) a number of encapsulation packets which have been transmitted between the first computing device and the second computing device during a particular time interval, (c) a number of bytes which have been transmitted between the first computing device and the second computing device during a particular time interval, or (d) a length of a time interval during which a network packet tracking session has not been established between the first and second encapsulation protocol processing components.

21. The non-transitory computer-accessible storage medium as recited in claim 17, wherein the first encapsulation protocol processing component is configured to:

determine one or more route variation parameters for network packets transmitted between the first computing device and second computing device, wherein the one or more route variation parameters include a number of network ports available at the second computing device; and set, based at least in part on the one or more route variation parameters, a particular bit sequence of a second tracked packet of the one or more tracked packets, such that a route traversed by the second tracked packet to reach the second computing device comprises at least one network link which was not traversed by the first tracked packet.

* * * * *